(12) United States Patent
Iwamura et al.

(10) Patent No.: US 11,153,572 B2
(45) Date of Patent: Oct. 19, 2021

(54) ENCODING DEVICE, DECODING DEVICE, AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP)

(73) Assignee: NIPPON ROSO KYOKAI, Tokyo (JP)

( * ) Notice: Subject to any disclaimer, the term of this patent is extended or adjusted under 35 U.S.C. 154(b) by 0 days.

(21) Appl. No.: 15/999,205

(22) Filed: Aug. 17, 2018

(65) Prior Publication Data
US 2018/0376147 A1 Dec. 27, 2018

Related U.S. Application Data

(63) Continuation of application No. PCT/JP2017/005997, filed on Feb. 17, 2017.

(30) Foreign Application Priority Data

Feb. 17, 2016 (JP) .............................. JP2016-028437
Feb. 17, 2016 (JP) .............................. JP2016-028438

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/12* (2014.11);
(Continued)

(58) Field of Classification Search
CPC .... H04N 19/159; H04N 19/105; H04N 19/12; H04N 19/129; H04N 19/13; H04N 19/176; H04N 19/44; H04N 19/593; H04N 19/61
(Continued)

(56) References Cited

U.S. PATENT DOCUMENTS

| 8,194,749 B2 | 6/2012 | Kim et al. | |
|---|---|---|---|
| 2007/0041450 A1* | 2/2007 | Kim ..................... | H04N 19/176 375/240.24 |

(Continued)

FOREIGN PATENT DOCUMENTS

| CN | 100586187 C | 1/2010 |
|---|---|---|
| JP | 2007-096679 A | 4/2007 |

(Continued)

OTHER PUBLICATIONS

Shibahara et al. (WO 2012096194A1) machine translation, Jul. 19, 2012, pp. 2, 4-6 and 12. (Year: 2012).*

(Continued)

*Primary Examiner* — Matthew K Kwan
(74) *Attorney, Agent, or Firm* — Studebaker & Brackett PC

(57) ABSTRACT

It is possible to reduce an increase in entropy even if a reference pixel of a lower side or a right side is used in intra prediction. An encoding device 1 according to the present invention includes: an intra predictor 14a configured to generate a predicted image by using an intra prediction mode; a residual signal generator 14b configured to generate a residual signal from a difference between the predicted image and an original image; and an orthogonal transformer 14c configured to, when the intra predictor 14a generates the predicted image by using a reference pixel positioned on at least one of a right side and a lower side, perform orthogonal transformation processing on the residual signal after inverting a basis of at least one of a horizontal direction and a vertical direction.

3 Claims, 13 Drawing Sheets

(51) Int. Cl.

| | | |
|---|---|---|
| *H04N 19/61* | (2014.01) | |
| *H04N 19/13* | (2014.01) | |
| *H04N 19/44* | (2014.01) | |
| *H04N 19/176* | (2014.01) | |
| *H04N 19/12* | (2014.01) | |
| *H04N 19/593* | (2014.01) | |
| *H04N 19/129* | (2014.01) | |

(52) U.S. Cl.
CPC .......... *H04N 19/129* (2014.11); *H04N 19/13* (2014.11); *H04N 19/176* (2014.11); *H04N 19/44* (2014.11); *H04N 19/593* (2014.11); *H04N 19/61* (2014.11)

(58) Field of Classification Search
USPC .................................................. 375/240.12
See application file for complete search history.

(56) References Cited

U.S. PATENT DOCUMENTS

| | | |
|---|---|---|
| 2013/0003856 A1 | 1/2013 | Saxena et al. |
| 2013/0128966 A1 | 5/2013 | Gao et al. |
| 2014/0064361 A1 | 3/2014 | Karczewicz et al. |

FOREIGN PATENT DOCUMENTS

| | | |
|---|---|---|
| JP | 2014-045434 A | 3/2014 |
| WO | WO 2012-096194 A1 | 7/2012 |
| WO | WO 2014/176362 A1 | 10/2014 |

OTHER PUBLICATIONS

Mochizuki et al., "An Adaptive Intra Prediction Method Based on Mean Value Coordinates," English Abstract, Information Processing Society Research Report, vol. 2012-AVM-77, No. 12, dated Jul. 20, 2012, pp. 1-6.

Office Action in Europe Application No. 17753339.5, dated Oct. 7, 2019, 18 pages.

Iwamura et al., "Direction-dependent sub-TU scan order on intra prediction", 2nd JVET Meeting; Feb. 20-26, 2016; San Diego; (The Joint Video Exploration Team of ISO/IEC JTC1/SC29/ WG11 and ITU-T SG.16 ); URL: http://phenix.int-evry.fr/jvet/, no. JVET-BOO28, Feb. 15, 2016 (Feb. 15, 2016), XP030150017, 4 pages.

Siwei et al., "Mode Dependent Coding Tools for Video Coding", IEEE Journal of Selected Topics in Signal Processing, vol. 7, No. 6, Dec. 1, 2013 (Dec. 1, 2013), pp. 990-1000, XP055626670, 11 pages.

Iwamura et al., "Direction-dependent scan order with JEM tools", 3rd JVET Meeting; May 5-Jun. 1, 2016; Geneva; (The Joint Video Exploration Team of ISO/IEC JTC1/SC29/WG11 and ITU-T SG.16 ); URL: httpi//phenix.int-evry.fr/jvet/,, n0. JVET-00069-v4, May 28, 2016 (May 28, 2016), XP030150174, 6 pages.

Iwamura et al., "Intra Prediction using Adaptive TU Scan Order with Residue Flipping", 2016 Picture Coding Symposium (PCS), IEEE, Dec. 4, 2016 (Dec. 4, 2016), pp. 1-4, XP033086903, DOI: 10.1109/PCS.2016.7906395 [retrieved on Apr. 19, 2017], 4 pages.

Zhao et al., "Mode-dependent residual reordering for Intra prediction residual (presentation requested 23rd or later)", 2nd JCT-VC Meeting; Jul. 21-Jul. 28, 2010; Geneva; (Joint Collaborativeteam on Video Coding) of ISO/IEC JTCI/SC29/WG11 and ITU-T SG.16; URL:http://nftp3.itu.int/av-arch/jctvc-site/, No. JCTVC-B102, Jul. 24, 2010 (Jul. 24, 2010), XP030007682, 5 pages.

Benny Bing: II2.4.4 Asymmetric dst In: "Next-Generation Video Coding and Streaming", Aug. 29, 2015 (Aug. 29, 2015), Wiley, XP55625777, 3 pages.

Extended European Search Report for Europe Application No. 17753339.5, dated Jan. 28, 2020.

He et al., "Rotation of Residual block for Transform Skipping in HM8", 102, MPEG Meeting; Oct. 15, 2012 to Oct. 19, 2012; Shanghai; (Motion Picture Expert Group or ISO/IEC JTC1/SC29/ WG11), No. M26570, dated Oct. 12, 2012, XP030054903, 5 pages.

An et al., "Residue scan for intra transform skip mode", 10. JCT-VC Meeting; 101. MPEG Meeting; Jul. 11, 2012 to Jul. 20, 2012; Stockholm; (Joint Collaborative Team on Video Coding of ISO/IEC JTC1/SC29/WG11 and ITU-T SG.16); obtained from the Internet at URL: <https://wftp3.itu.int/av-arch/jctvc-site>, No. JCTVC-J0053, dated Jul. 1, 2012, XP030112415, 5 pages.

Weerakkody et al., "Mirroring of Coefficients for Transform Skipping", 11. JCT-VC Meeting; 102.0MPEG Meeting; Oct. 10, 2012 to Oct. 19; Shanghai; (Joint Collaborative Team on Video Coding of ISO/IEC JTC1/SC29/WG11 and ITU-T SG.16); obtained from the Internet at URL: http://wftp3.itu.int/av-arch/jctvc-site>, No. JCTVC-K0294, dated Oct. 3, 2012, XP030113176; 3 pages.

\* cited by examiner

○ DECODED REFERENCE PIXEL
● UNDECODED REFERENCE PIXEL

DST BASIS

RESIDUAL SIGNAL

ENCODING DEVICE, DECODING DEVICE, AND PROGRAM

RELATED APPLICATIONS

This application is a continuation of PCT/JP2017/005997 filed on Feb. 17, 2017, which claims priority to Japanese Application Nos. 2016-028437 and 2016-028438 both filed on Feb. 17, 2016. The entire contents of these applications are incorporated herein by reference.

BACKGROUND OF THE INVENTION

1. Field of the Invention

The present invention relates to an encoding device, a decoding device, and a program.

2. Description of the Related Art

A moving image (video) encoding method represented by H.265/HEVC (High Efficiency Video Coding) is configured to generate a residual signal by performing prediction while switching between two types of prediction, that is, inter prediction using temporal correlation between frames and intra prediction using spatial correlation within a frame, and output a stream obtained by orthogonal transformation processing, loop filter processing, or entropy coding processing.

In intra prediction in HEVC, there are 35 types of modes including planer prediction, DC prediction, and direction prediction, and intra prediction using neighboring decoded reference pixels is performed according to a mode determined by an encoder.

Here, in the intra prediction, in a coding target block (hereinafter, referred to as "coding unit (CU)") in which there is no neighboring decoded reference pixel such as a CU positioned at the top left in a frame, a reference pixel to be used for generating a predicted image is created by filling a predetermined value ("512" in the case of a 10-bit moving image).

In addition, in the conventional HEVC, the encoding process is performed from the top left in the raster scan order, so that the reference pixels may not be decoded. In such a case, a predicted image is generated by using a value obtained by zero-order extrapolation of the nearest decoded reference pixel.

In particular, in the intra prediction of the conventional HEVC, due to the encoding process in the raster scan order illustrated in FIG. 10A, the reference pixels positioned at the lower left or upper right of the CU are often not decoded, other than at the edge of the frame due to the division shape of the TU (see FIG. 10B). In such a case, when direction prediction is performed from the direction in which reference pixels that are not decoded exist, the prediction accuracy decreases, resulting in a reduction in encoding efficiency.

In order to solve such problems, in the intra prediction, there is known a technique for improving prediction accuracy by giving the degree of freedom in the encoding order of U type, X type, or the like, in addition to raster scanning order (for example, Z type), as the order of encoding processing for a plurality of transformation blocks (hereinafter, referred to as "transform unit (TU)") existing in the CU (see Non-Patent Literature 1).

In the examples of in FIGS. 10A and 10B, direction prediction is performed in a direction from the lower left to the upper right (a direction opposite to a direction indicated by a dashed line arrow in FIGS. 10A and 10B), and a pixel on a dashed arrow is predicted by using a lower left reference pixel. In the drawings of this specification, the arrow indicating the direction (prediction direction) of the intra prediction mode is assumed to go from the pixel targeted for intra prediction to the reference pixel in the same manner as described in the HEVC specification (the same applies hereinafter).

In a picture if there is a texture in a very local region in a flat image or if a small object moves in another direction in a global motion in which an entire screen moves, prediction accuracy is high in many regions of predicted images generated by intra prediction or inter prediction, and energy of a residual signal concentrates on some regions in which the prediction did not hit.

In this manner, if the energy of the residual signal is already concentrated at a stage before orthogonal transformation processing is applied, there is a possibility that the entropy will increase by applying orthogonal transformation processing.

Therefore, in the conventional HEVC, a "TransformSkip mode" in which the orthogonal transformation processing is not applied to the residual signal is prepared.

In the conventional HEVC, as illustrated in FIG. 11, intra prediction is prediction using decoded reference pixels on the spatially neighboring upper side or the left side, the accuracy of the predicted image at the position close to the decoded reference pixel tends to be high, and the accuracy of the predicted image at a position far from the decoded reference pixel tends to be low.

That is, in the residual signal generated by intra prediction, energy at a position close to the decoded reference pixel tends to be low, and energy at a position far from the decoded reference pixel tends to be high.

If orthogonal transformation processing is applied to the residual signal, the transformation coefficient obtained by the orthogonal transformation processing tends to increase energy of an upper left region corresponding to a low frequency component.

In the entropy coding processing, such a tendency is also used, but in the TransformSkip mode, the energy of the residual signal increases as the position is farther from the decoded reference pixel. Therefore, in the case of intra prediction using reference pixels on the left side or the upper side, the energy tends to become larger in the lower right region of the residual signal.

Therefore, in TransformSkip mode, if the same entropy coding processing as in the case where the orthogonal transformation processing is applied to the residual signal is applied, there is a problem that the encoding efficiency is lowered.

Therefore, in order to solve such problems, when the TransformSkip mode is applied in HEVC, the energy distribution of the residual signal is brought close to the energy distribution of the transformation coefficient, which is generated when the orthogonal transformation processing is applied, by inverting the residual signal in the vertical direction and the horizontal direction, thereby improving the efficiency in subsequent entropy encoding processing.

CITATION LIST

Non Patent Literature

Non Patent Literature 1: Mochizuki et al., "An Adaptive Intra Prediction Method Based on Mean Value Coordinates", Information Processing Society Research Report, vol, 2012-AVM-77, No. 12

SUMMARY OF THE INVENTION

Technical Problem

In the conventional HEVC, as illustrated in FIG. 11, intra prediction is prediction using decoded reference pixels on the spatially neighboring upper side or the left side, the accuracy of the predicted image at the position close to the decoded reference pixel tends to be high, the accuracy of the predicted image at a position far from the decoded reference pixel tends to be low, orthogonal transformation such as discrete sine transformation (hereinafter referred to as "DST") or discrete cosine transformation (hereinafter referred to as "DCT") is applied in the horizontal and vertical directions from the left and upper direction where the decoded reference pixel is positioned, and the entropy of the residual signal is reduced.

In particular, since the shape of the impulse response of DST is asymmetric such that one end is closed and the other end is widened, as illustrated in FIG. 12, it is possible to effectively reduce the entropy by applying DST according to the signal intensity of the generated residual signal as illustrated in FIG. 13.

As described above, in the technique disclosed in Non Patent Literature 1, improvement in prediction accuracy is realized by giving the degree of freedom in the encoding order of transformation blocks. When the encoding order is changed, there are cases where blocks positioned on the lower side or the right side of the coding target block have already been encoded, and it is possible to use lower or right reference pixels in intra prediction.

In such a case, in the residual signal, the signal intensity on the lower side or the right side close to the position of the reference pixel tends to be smaller, and the signal intensity on the upper side or the left side far from the position of the reference pixel tends to be higher. Therefore, when orthogonal transformation is applied as usual, entropy may be increased. This is the cause of lowering the encoding efficiency.

In addition, in such a case, in the residual signal, the signal intensity on the lower side or the right side close to the position of the reference pixel tends to be smaller, and the signal intensity on the upper side or the left side far from the position of the reference pixel tends to be higher.

However, in the TransformSkip mode in the conventional HEVC, the residual signal is inverted in the vertical direction and the horizontal direction regardless of the position of the reference pixel. Therefore, if intra prediction using decoded reference pixels on the right side or the lower side is performed, there is a problem that the energy of the residual signal does not concentrate on the upper left region and the encoding efficiency is lowered.

Therefore, the present invention has been made to solve the above-mentioned problems, and it is an object of the present invention to provide an encoding device, a decoding device, and a program, capable of reducing an increase in entropy even if a reference pixel on a lower side or a right side is used in intra prediction.

In addition, it is an object of the present invention to provide an encoding device, a decoding device, and a program, capable of suppressing a reduction in encoding efficiency if at least one of reference pixels on a lower side and a right side is used in intra prediction and even if orthogonal transformation processing (or inverse orthogonal transformation processing) is not applied to a residual signal.

Solution to Problem

A first feature of the present invention is an encoding device configured to encode an original image of a frame unit constituting a video by dividing the original image into encoding target blocks. The encoding device is characterized by comprising: an intra predictor configured to generate a predicted image by using an intra prediction mode; a residual signal generator configured to generate a residual signal from a difference between the predicted image and the original image; and an orthogonal transformer configured to, when the intra predictor generates the predicted image by using a reference pixel positioned on at least one of a right side and a lower side, perform orthogonal transformation processing on the residual signal after inverting a basis of at least one of a horizontal direction and a vertical direction.

A second feature of the present invention is a decoding device configured to perform decoding by dividing an original image of a frame unit constituting a video into encoding target blocks. The decoding device is characterized by comprising: an intra predictor configured to generate a predicted image by using an intra prediction mode; and an inverse transformer configured to, when the intra predictor generates the predicted image by using a reference pixel positioned on at least one of a right side and a lower side, generate a residual signal by performing inverse orthogonal transformation processing on a transformation coefficient after inverting a basis of at least one of a horizontal direction and a vertical direction.

A third feature of the present invention is an encoding device configured to encode an original image of a frame unit constituting a video by dividing the original image into encoding target blocks. The encoding device is characterized by comprising: an intra predictor configured to generate a predicted image by using an intra prediction mode; and a residual signal generator configured to generate a residual signal from a difference between the predicted image and the original image; and an orthogonal transformer configured to, when the intra predictor generates the predicted image by using a reference pixel positioned on at least one of a right side and a lower side, perform orthogonal transformation processing after inverting the residual signal in at least one of a horizontal direction and a vertical direction.

A fourth feature of the present invention is a decoding device configured to perform decoding by dividing an original image of a frame unit constituting a video into encoding target blocks. The decoding device is characterized by comprising: an intra predictor configured to generate a predicted image by using an intra prediction mode; and an inverse transformer configured to, when the intra predictor generates the predicted image by using a reference pixel positioned on at least one of a right side and a lower side, generate a residual signal by inverting a signal, which is obtained by performing inverse orthogonal transformation processing on a transformation coefficient, in at least one of a horizontal direction and a vertical direction.

A fifth feature of the present invention is an encoding device configured to encode an original image of a frame unit constituting a video by dividing the original image into encoding target blocks. The encoding device is characterized by comprising: an intra predictor configured to generate a predicted image by using an intra prediction mode; and a residual signal generator configured to generate a residual signal from a difference between the predicted image and the original image, wherein when orthogonal transformation processing is not applied, the residual signal generator is configured to invert the residual signal in at least one of a horizontal direction and a vertical direction, based on a position of a reference pixel used when the intra predictor generates the predicted image.

A sixth feature of the present invention is a decoding device configured to perform decoding by dividing an original image of a frame unit constituting a video into encoding target blocks. The decoding device is characterized by comprising: an intra predictor configured to generate a predicted image by using an intra prediction mode; and an inverse transformer configured to, when inverse orthogonal transformation processing is not applied, generate a residual signal by inverting a signal, which is obtained by entropy decoding processing and inverse quantization processing, in at least one of a horizontal direction and a vertical direction, based on a position of a reference pixel used when the intra predictor generates the predicted image.

A seventh feature of the present invention is a program for causing a computer to function as the encoding device according to the first, third, or fifth feature.

An eighth feature of the present invention is a program for causing a computer to function as the decoding device according to the second, fourth, or sixth feature.

Advantageous Effects of Invention

According to the present invention, it is possible to provide an encoding device, a decoding device, and a program, capable of reducing an increase in entropy even if a reference pixel on a lower side or a right side is used in intra prediction.

In addition, it is possible to provide an encoding device, a decoding device, and a program, capable of suppressing a reduction in encoding efficiency if at least one of reference pixels on a lower side and a right side is used in intra prediction and even if orthogonal transformation processing is not applied to a residual signal.

DETAILED DESCRIPTION OF THE PREFERRED EMBODIMENTS

First Embodiment

Hereinafter, an encoding device 1 and a decoding device 3 according to a first embodiment of the present invention will be described with reference to FIGS. 1 to 5. Here, the encoding device 1 and the decoding device 3 according to the present embodiment are configured to correspond to intra prediction in a video encoding method such as HEVC. The encoding device 1 and the decoding device 3 according to the present embodiment are configured so as to correspond to arbitrary video encoding methods as long as they are of a video encoding method that performs intra prediction.

The encoding device 1 according to the present embodiment is configured to encode an original image of a frame unit constituting a video by dividing the original image into CUs. In addition, the encoding device 1 according to the present embodiment may be configured to be able to divide a CU into a plurality of TUs. Hereinafter, in the present embodiment, a case where the CU is divided into the plurality of TUs will be described as an example, but the present invention is also applicable to a case where the CU is not divided into the plurality of TUs.

In the present embodiment, in a CU to be encoded in which there is no neighboring decoded reference pixel such as a CU positioned at the top left in a frame, a reference pixel to be used for generating a predicted image is created by filling a predetermined value ("512" in the case of a 10-bit video). Therefore, it is assumed that all the pixels neighboring to the left side or the upper side of the CU to be encoded can be used as reference pixels.

Figure 1:
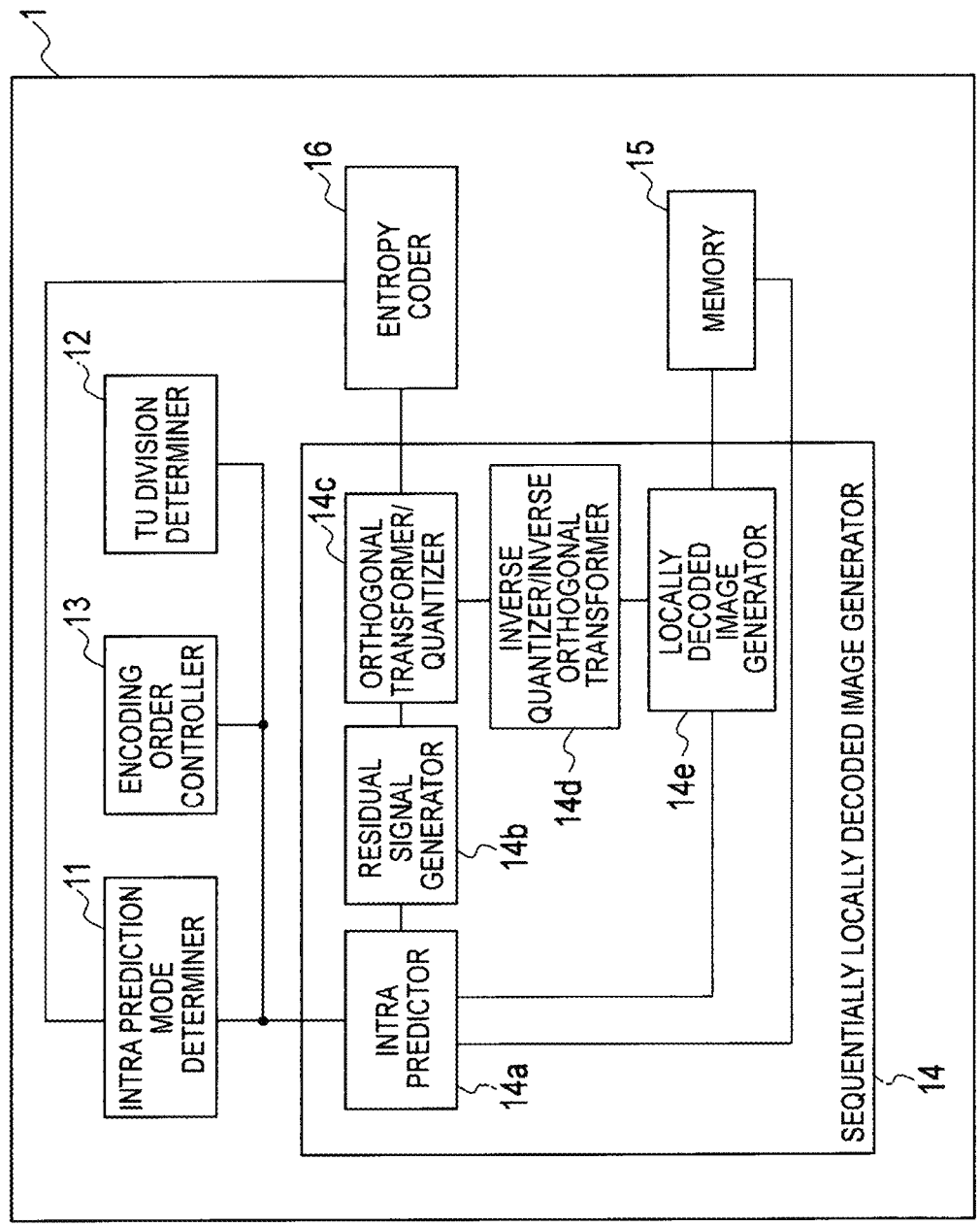
FIG. 1 is a functional block diagram of an encoding device 1 according to a first embodiment.

As illustrated in FIG. 1, the encoding device 1 according to the present embodiment includes an intra prediction mode determiner 11, a TU division determiner 12, an encoding order controller 13, a sequentially locally decoded image generator 14, a memory 15, and an entropy coder 16.

The intra prediction mode determiner 11 is configured to determine an optimum intra prediction mode to be applied to a CU.

The TU division determiner 12 is configured to determine whether to divide a CU into a plurality of TUs. In the present embodiment, as a method of dividing a CU into a plurality of TUs, a case of 4-division is described as an example, but the division number and the division shape when dividing a CU into a plurality of TUs are not limited to such a case.

The encoding order controller 13 is configured to determine the encoding order of the TUs in the CU based on the intra prediction mode (for example, the direction of the intra prediction mode).

Specifically, if it is determined by the TU division determiner 12 to divide the CU into the plurality of TUs, as illustrated in FIGS. 2A to 2D, if the direction of the intra prediction mode determined by the intra prediction mode determiner 11 is the direction from the lower left to the upper right (that is, if the direction prediction is performed from the lower left to the upper right), the encoding order controller 13 may be configured to adopt a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A)→TU #A1 (upper left TU in CU #A)→TU #A4 (lower right TU in CU #A)→TU #A2 (upper right TU in CU #A), as the encoding order of the TU in the CU, instead of the conventional raster scan order (Z type as illustrated in FIG. 8A).

In addition, if it is determined by the TU division determiner 12 to divide the CU into the plurality of TUs, and if the direction of the intra prediction mode determined by the intra prediction mode determiner 11 is the direction from the upper right to the lower left (that is, if the direction prediction is performed from the upper right to the lower left), the encoding order controller 13 may be configured to adopt a predefined encoding order between the encoding order of TU #A2 (upper right TU in CU #A)→TU #A4 (lower right TU in CU #A)→TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A), instead of the conventional raster scan order (Z type as illustrated in FIG. 8A).

The sequentially locally decoded image generator 14 is configured to generate locally decoded images (decoded images for each TU) based on the encoding order determined by the encoding order controller 13 and the method of dividing the CU into TUs.

Specifically, if it is determined by the TU division determiner 12 to divide the CU into the plurality of TUs, the sequentially locally decoded image generator 14 is configured to sequentially generate the locally decoded images according to the encoding order determined by the encoding order controller 13.

As illustrated in FIG. 1, the sequentially locally decoded image generator 14 includes an intra predictor 14a, a residual signal generator 14b, an orthogonal transformer/quantizer 14c, an inverse quantizer/inverse orthogonal transformer 14d, and a locally decoded image generator 14e.

The intra predictor 14a is configured to generate a predicted image by using the intra prediction mode determined by the intra prediction mode determiner 11. That is, the intra predictor 14a is configured to determine the position of the reference pixel used for generating the predicted image.

Specifically, if it is determined by the TU division determiner 12 to divide the CU into the plurality of TUs, as illustrated in FIGS. 2A to 2D, if the direction of the intra prediction mode (prediction direction) is the direction from the lower left to the upper right, the intra predictor 14a may be configured to generate a predicted image in a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A)→TU #A1 (upper left TU in CU #A)→TU #A4 (lower right TU in CU #A)→TU #A2 (upper right TU in CU #A).

Here, as illustrated in FIGS. 2C and 2D, the intra predictor 14a may be configured to generate a predicted image by using decoded reference pixels neighboring on the left side and the lower side with respect to TU #A1 (upper left TU in CU #A) and TU #A2 (upper right TU in CU #A) where the neighboring lower reference pixels are decoded.

In addition, in the encoding device 1 according to the present embodiment, if it is determined by the TU division determiner 12 to divide the CU into the plurality of TUs, and if the direction of the intra prediction mode (prediction direction) is the direction from the upper right to the lower left, the intra predictor 14a may be configured to generate a predicted image in a predefined encoding order between the encoding order of TU #A2 (upper right TU in CU #A)→TU #A4 (lower right TU in CU #A)→TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A).

Here, the intra predictor 14a may be configured to generate a predicted image by using decoded reference pixels neighboring on the upper side and the right side with respect to TU #A1 (upper left TU in CU #A) and TU #A3 (lower left TU in CU #A) wherein the neighboring right reference pixels are decoded.

Figure 2:
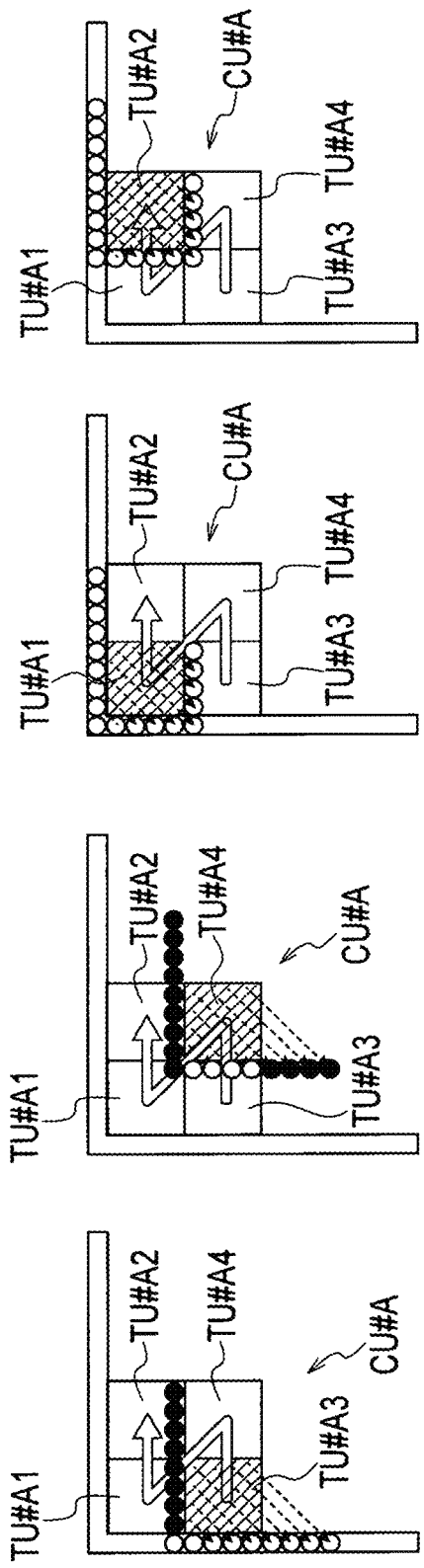
FIGS. 2A through 2D are diagrams illustrating an example of intra prediction when TU division is performed in the first embodiment.

Alternatively, if the encoding order of TU #A3 (lower left TU in CU #A)→TU #A4 (lower right TU in CU #A)→TU #A (upper left TU in CU #A)→TU #A2 (upper right TU in CU #A), or the encoding order of TU #A3 (lower left TU in CU #A)→TU #A1 (upper left TU in CU #A)→TU #A4 (lower right TU in CU #A)→TU #A2 (upper right TU in CU #A) is used, the intra predictor 14a may be configured to perform predefined prediction such as linear interpolation using decoded reference pixels neighboring to the left side, upper side, or lower side of the TU with respect to the TU in which reference pixels neighboring to the upper side are decoded (TU positioned at the uppermost position among the divided TU groups, TU #A1 and TU #A2 in the example of FIG. 2), instead of a common intra prediction direction in CU #A.

In addition, the intra predictor 14a may be configured to generate a predicted image by using the decoded reference pixels neighboring in three directions, that is, the lower side, the left side, and the upper side.

Alternatively, the intra predictor 14a may be configured to generate a predicted image by using the decoded reference pixels neighboring in three directions, that is, the right side, the left side, and the upper side.

The residual signal generator 14b is configured to generate a residual signal from a difference between the predicted image generated by the intra predictor 14a and the original image.

The orthogonal transformer/quantizer 14c is configured to perform orthogonal transformation processing and quantization processing on the residual signal generated by the residual signal generator 14b to generate quantized transformation coefficients.

Here, the orthogonal transformer/quantizer 14c is configured to determine whether to invert the basis used for orthogonal transformation processing based on the position of the reference pixel used for generating the predicted image determined by the intra predictor 14a.

For example, if the intra predictor 14a generates the predicted image by using reference pixels positioned on at least one of the right side and the lower side (that is, reference pixels neighboring to at least one of the right side and the lower side), the orthogonal transformer/quantizer 14c is configured to perform orthogonal transformation processing after inversing the basis of at least one of the vertical direction and the horizontal direction with respect to the residual signal generated by the residual signal generator 14b.

On the other hand, if the intra predictor 14a does not generate the predicted image even when the reference pixels positioned on the right side and the lower side are used, the orthogonal transformer/quantizer 14c is configured to perform orthogonal transformation processing on the residual signal generated by the residual signal generator 14b without inverting the basis.

For example, if the intra predictor 14a generates the predicted image by using the reference pixels positioned on the left side and the lower side, the orthogonal transformer/quantizer 14c may be configured to perform orthogonal transformation processing after inverting the basis of the vertical direction.

In addition, if the intra predictor 14a generates the predicted image by using the reference pixels positioned on the right side and the upper side, the orthogonal transformer/quantizer 14c may be configured to perform orthogonal transformation processing after inverting the basis of the horizontal direction.

Furthermore, if the intra predictor 14a generates the predicted image by using the reference pixels positioned on the right side and the lower side, the orthogonal transformer/quantizer 14c may be configured to perform orthogonal transformation processing after inverting the basis of the vertical direction and the horizontal direction.

If the intra predictor 14a generates the predicted image by using the reference pixel positioned on at least one of the right side and the lower side, and if the orthogonal transformation processing to be applied is asymmetric orthogonal transformation processing (for example, DST or the like), the orthogonal transformer/quantizer 14c may be configured to invert the basis of at least one of the vertical direction and the horizontal direction used for orthogonal transformation processing with respect to the residual signal generated by the residual signal generator 14b.

That is, even if the intra predictor 14a generates the predicted image by using the reference pixel positioned on at least one of the right side and the lower side, if the orthogonal transformation processing to be applied is symmetric orthogonal transformation processing (for example, DCT or the like), the orthogonal transformer/quantizer 14c may be configured to invert the basis used for orthogonal transformation processing with respect to the residual signal generated by the residual signal generator 14b.

In addition, if the intra predictor 14a generates the predicted image by using the reference pixels neighboring in three directions, such as the lower side, the left side, and the upper side, the orthogonal transformer/quantizer 14c may be configured not to invert the basis used for orthogonal transformation processing with respect to the residual signal generated by the residual signal generator 14b.

According to this configuration, in the residual signal, since there is a high possibility that the signal intensity will be low at both the upper side and the lower side close to the reference pixel, the processing amount of the encoding device 1 can be reduced by not performing the above-described inversion processing.

In addition, if the intra predictor 14a generates the predicted image by using the reference pixels neighboring in three directions, such as the right side, the left side, and the upper side, the orthogonal transformer/quantizer 14c may be configured not to invert the basis used for orthogonal transformation processing with respect to the residual signal generated by the residual signal generator 14b.

According to this configuration, in the residual signal, since there is a high possibility that the signal intensity will be low at both the right side and the left side close to the reference pixel, the processing amount of the encoding device 1 can be reduced by not performing the above-described inversion processing.

The inverse quantizer/inverse orthogonal transformer 14d is configured to perform inverse quantization processing and inverse orthogonal transformation processing again on the quantized transformation coefficients generated by the orthogonal transformer/quantizer 14c and generate the residual signal.

Here, if the orthogonal transformer/quantizer 14c inverts the basis used in the orthogonal transformation processing, the inverse quantizer/inverse orthogonal transformer 14d is configured to perform inverse orthogonal transformation processing after inverting the basis.

The locally decoded image generator 14e is configured to generate the locally decoded image by adding the predicted image generated by the intra predictor 14a to the residual signal generated by the inverse quantizer/inverse orthogonal transformer 14d.

The memory 15 is configured to hold the locally decoded image generated by the sequentially locally decoded image generator 14 so as to be usable as a reference image.

The entropy coder 16 is configured to output a stream by performing entropy coding processing on flag information including the intra prediction mode or the like determined by the intra prediction mode determiner 11 or the quantized transformation coefficients.

Figure 3:
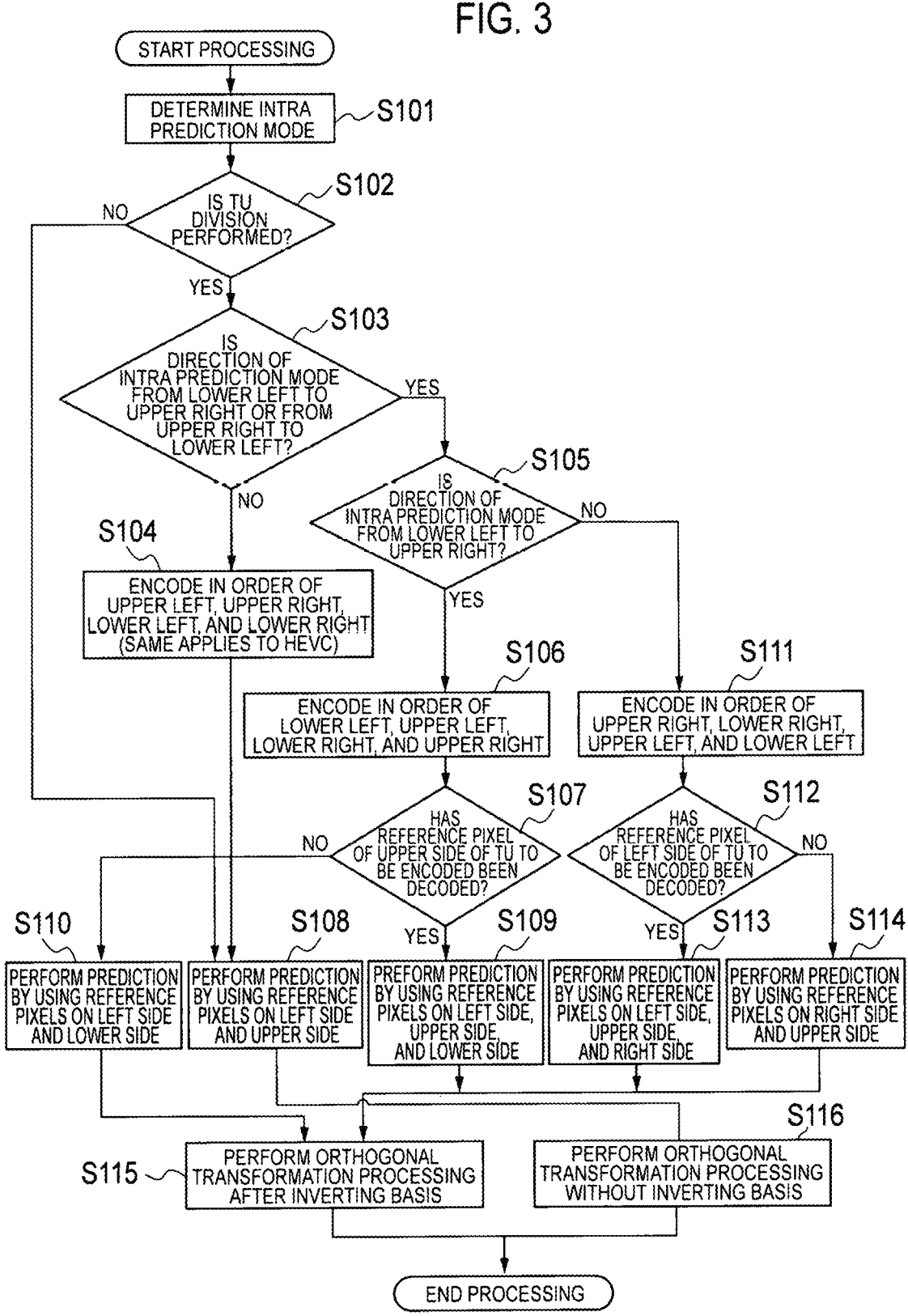
FIG. 3 is a flowchart illustrating the operation of the encoding device 1 according to the first embodiment.

FIG. 3 illustrates a flowchart for explaining an example of the operation of the encoding device 1 according to the present embodiment.

As illustrated in FIG. 3, in step S101, the encoding device 1 determines an optimum intra prediction mode to be applied to the CU.

In step S102, the encoding device 1 determines whether to divide the CU into the plurality of TUs. If it is determined in step S102 to divide the CU into the plurality of TUs, the operation proceeds to step S103. On the other hand, if it is determined in step S102 that the CU is not divided into the plurality of TUs, the operation proceeds to step S108.

If it is determined in step S103 that the direction of the intra prediction mode is the direction from the lower left to the upper right or the direction from the upper right to the lower left, the operation proceeds to step S105. On the other hand, if it is determined in step S103 that the direction of the intra prediction mode is other than the direction from the lower left to the upper right and the direction from the upper right to the lower left, the operation proceeds to step S104.

In step S104, the encoding device 1 adopts the raster scan order (Z type as illustrated in FIG. 8A) used in the conventional HEVC as the encoding order described above.

In step S108, the encoding device 1 performs predefined prediction on the TU to be encoded by using the decoded reference pixels neighboring on the left side and the upper side of the TU.

If it is determined that the direction of the intra prediction mode is the direction from the lower left to the upper right (step S105), in step S106, the encoding device 1 adopts, as the encoding order, a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A)→TU #A1 (upper left TU in CU #A)→TU #A4 (lower right TU in CU #A)→TU #A2 (upper right TU in CU #A).

On the other hand, if it is determined that the direction of the intra prediction mode is not the direction from the lower left to the upper right (step S105), in step S111, the encoding device 1 adopts, as the encoding order, a predefined encoding order between the encoding order of TU #A2 (upper right TU in CU #A)→TU #A4 (lower right TU in CU

A)→TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A).

In step S107, the encoding device 1 determines whether the reference pixel neighboring to the upper side of the TU to be encoded has been decoded. In step S107, if decoded, the operation proceeds to step S109, and if not decoded, the operation proceeds to step S110.

In step S109, the encoding device 1 performs predefined prediction on the TU to be encoded by using the decoded reference pixels neighboring on the left side, the upper side, and the lower side of the TU.

In step S110, the encoding device 1 performs predefined prediction on the TU to be encoded by using the decoded reference pixels neighboring on the left side and the lower side of the TU.

In step S112, the encoding device 1 determines whether the reference pixel neighboring to the left side of the TU to be encoded has been decoded. In step S112, if decoded, the operation proceeds to step S113, and if not decoded, the operation proceeds to step S114.

In step S113, the encoding device 1 performs predefined prediction on the TU to be encoded by using the decoded reference pixels neighboring on the left side, the upper side, and the right side of the TU.

In step S114, the encoding device 1 performs predefined prediction on the TU to be encoded by using the decoded reference pixels neighboring on the right side and the upper side of the TU.

In step S115, the encoding device 1 performs orthogonal transformation processing on the residual signal after inverting the basis, and then performs subsequent processing.

In step S116, the encoding device 1 performs orthogonal transformation processing on the residual signal without inverting the basis, and then performs subsequent processing.

According to the encoding device 1 of the present embodiment, if the predicted image is generated by using the reference pixel positioned on at least one of the right side and the lower side, the basis is inverted with respect to the residual signal and then the orthogonal transformation processing is performed, thereby reducing an increase in entropy.

In addition, the decoding device 3 according to the present embodiment is configured to decode an original image of a frame unit constituting a video by dividing the original image into CUs. In addition, as in the encoding device 1 according to the present embodiment, the decoding device 3 according to the present embodiment is configured to be able to divide a CU into a plurality of TUs.

Figure 4:
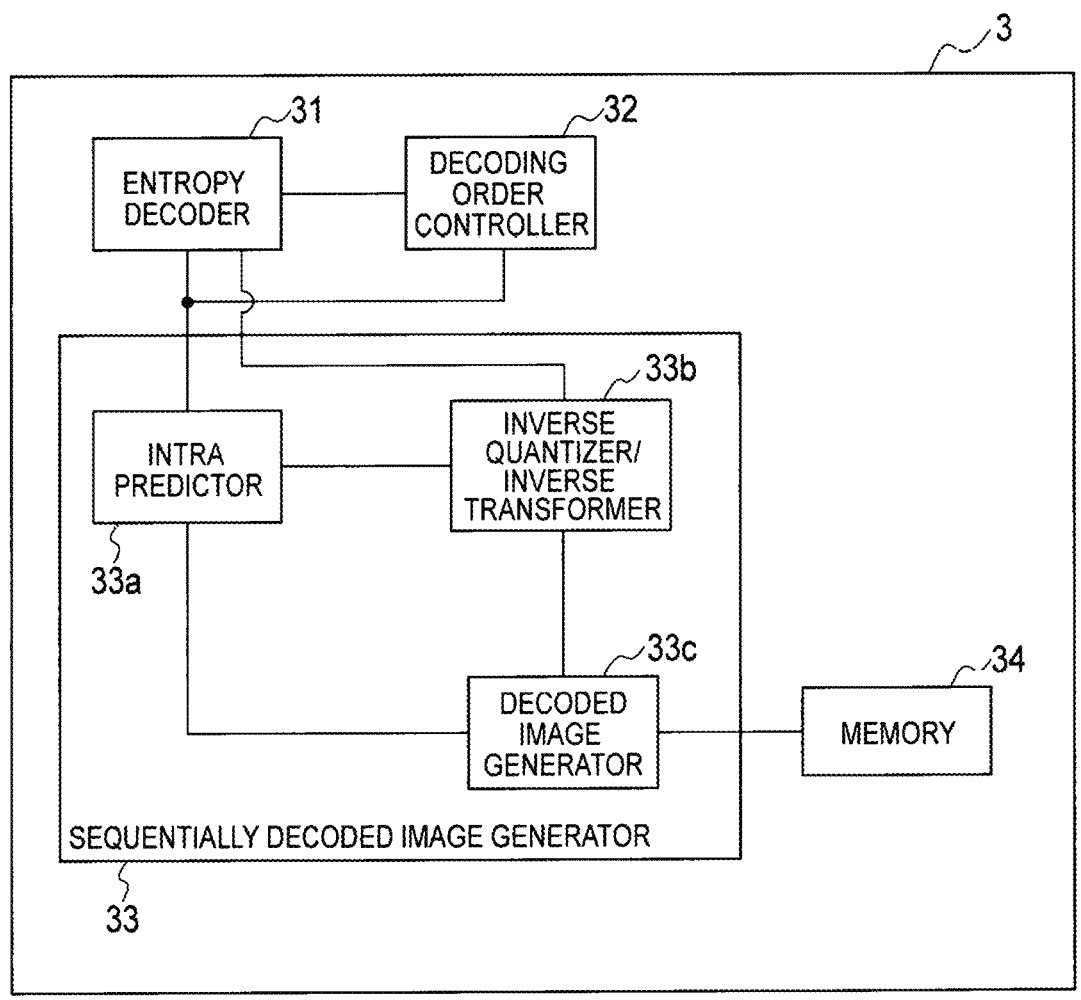
FIG. 4 is a functional block diagram of a decoding device 3 according to the first embodiment.

As illustrated in FIG. 4, the decoding device 3 according to the present embodiment includes an entropy decoder 31, a decoding order controller 32, a sequentially locally decoded image generator 33, and a memory 34.

The entropy decoder 31 is configured to decode transformation coefficients, flag information, and the like from the stream output from the encoding device 1. Here, the transformation coefficient is a quantized transformation coefficient obtained as a signal encoded by dividing an original image of a frame unit into CUs by the encoding device 1. In addition, the flag information includes accompanying information such as the prediction mode.

The decoding order controller 32 is configured to determine the decoding order of the TUs in the CU based on the intra prediction mode.

Specifically, the decoding order controller 32 is configured to determine the decoding order of the TUs in the CU according to the flag indicating whether the TU division output by the entropy decoder 31 has been performed (whether the CU is divided into the plurality of TUs) and the direction of the intra prediction mode.

For example, as in the encoding order controller 13, if the CU is divided into the plurality of TUs, and if the direction of the intra prediction mode is the direction from the lower left to the upper right, the decoding order controller 32 may be configured to perform decoding processing in a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A) TU #A1 (upper left TU in CU #A)→TU #A4 (lower right TU in CU #A)→TU #A2 (upper right TU in CU #A).

In addition, as in the encoding order controller 13, if the CU is divided into the plurality of TUs, and if the direction of the intra prediction mode is the direction from the upper right to the lower left, the decoding order controller 32 may be configured to perform decoding processing in a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

The sequentially locally decoded image generator 33 is configured to generate locally decoded images (decoded images for each TU) based on the decoding order determined by the decoding order controller 32 and the method of dividing the CU into the TUs.

Specifically, if the CU is divided into the plurality of TUs, the sequentially locally decoded image generator 33 is configured to generate the locally decoded image by sequentially performing intra prediction, inverse quantization processing, and inverse orthogonal transformation processing on the quantized transformation coefficients output by the entropy decoder 31 according to the decoding order determined by the decoding order controller 32.

As illustrated in FIG. 4, the sequentially locally decoded image generator 33 includes an intra predictor 33a, an inverse quantizer/inverse transformer 33b, and a decoded image generator 33c.

The intra predictor 33a may be configured to generate the predicted image by using the intra prediction mode output by the entropy decoder 31 according to the decoding order determined by the decoding order controller 32.

Specifically, if the CU is divided into the plurality of TUs, and if the direction of the intra prediction mode is the direction from the lower left to the upper right, the intra predictor 33a may be configured to generate a predicted image in a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A)→TU #A1 (upper left TU in CU #A)→TU #A4 (lower right TU in CU #A)→TU #A2 (upper right TU in CU #A).

Here, as illustrated in FIGS. 2C and 2D, the intra predictor 33a may be configured to generate a predicted image by using decoded reference pixels neighboring on the left side and the lower side with respect to TU #A1 (upper left TU in CU #A) and TU #A2 (upper right TU in CU #A) where the neighboring lower reference pixels are decoded.

In addition, in the decoding device 3 according to the present embodiment, if the CU is divided into the plurality of TUs, and if the direction of the intra prediction mode (prediction direction) is the direction from the upper right to the lower left, the intra predictor 33a may be configured to generate a predicted image in a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

Here, the intra predictor 33a may be configured to generate a predicted image by using decoded reference pixels neighboring on the upper side and the right side with respect to TU #A1 (upper left TU in CU #A) and TU #A3 (lower left TU in CU #A) wherein the neighboring right reference pixels are decoded.

Alternatively, if the decoding order of TU #A3 (lower left TU in CU #A)→TU #A4 (lower right TU in CU #A)→TU #A1 (upper left TU in CU #A)→TU #A2 (upper right TU in CU #A), or the decoding order of TU #A3 (lower left TU in CU #A)→TU #A1 (upper left TU in CU #A)→TU #A4 (lower right TU in CU #A)→TU #A2 (upper right TU in CU #A) is used, the intra predictor 33a may be configured to perform predefined prediction such as linear interpolation using decoded reference pixels neighboring to the left side, upper side, or lower side of the TU with respect to the TU in which reference pixels neighboring to the upper side are decoded (TU positioned at the uppermost position among the divided TU groups, TU #A1 and TU #A2 in the example of FIG. 2), instead of a common intra prediction direction in CU #A.

The inverse quantizer/inverse transformer 33b is configured to generate a residual signal by performing inverse quantization processing and inverse transformation processing (for example, inverse orthogonal transformation processing) on the quantized transformation coefficients output by the entropy decoder 31.

For example, if the intra predictor 33a generates the predicted image by using the reference pixel positioned on at least one of the right side and the lower side (that is, the reference pixel neighboring to at least one of the right side and the lower side), the inverse quantizer/inverse transformer 33b is configured to generate a residual signal by performing inverse orthogonal transformation processing on the above-described transformation coefficient after inverting the basis of at least one of the vertical direction and the horizontal direction.

On the other hand, if the intra predictor 33a does not generate the predicted image even by using the reference pixels positioned on the right side and the lower side, the inverse quantizer/inverse transformer 33b is configured to generate a residual signal by performing inverse orthogonal transformation processing on the above-described transformation coefficient without inverting the basis.

On the other hand, if the intra predictor 33a generates the predicted image by using the reference pixels positioned on the left side and the lower side, the inverse quantizer/inverse transformer 33b may be configured to generate a residual signal by performing inverse orthogonal transformation processing on the above-described transformation coefficient after inverting the basis of the vertical direction.

In addition, if the intra predictor 33a generates the predicted image by using the reference pixels positioned on the right side and the upper side, the inverse quantizer/inverse transformer 33b may be configured to generate a residual signal by performing inverse orthogonal transformation processing on the above-described transformation coefficient after inverting the basis of the horizontal direction.

Furthermore, if the intra predictor 33a generates the predicted image by using the reference pixels positioned on the right side and the lower side, the inverse quantizer/inverse transformer 33b may be configured to generate a residual signal by performing inverse orthogonal transformation processing on the above-described transformation coefficient after inverting the basis of the vertical direction and the horizontal direction.

If the intra predictor 33a generates the predicted image by using the reference pixel positioned on at least one of the right side and the lower side, and if the orthogonal transformation processing to be applied is asymmetric orthogonal transformation processing (for example, DST or the like), the inverse quantizer/inverse transformer 33b may be configured to generate a residual signal by performing inverse orthogonal transformation processing on the above-described transformation coefficient after inverting the basis.

That is, even if the intra predictor 33a generates the predicted image by using the reference pixel positioned on at least one of the right side and the lower side, if the orthogonal transformation processing to be applied is symmetric orthogonal transformation processing (for example, DCT or the like), the inverse quantizer/inverse transformer 33b may be configured to generate a residual signal by performing inverse orthogonal transformation processing on the above-described transformation coefficient without inverting the basis.

In addition, if the intra predictor 33a generates the predicted image by using the reference pixels neighboring in three directions, such as the lower side, the left side, and the upper side, the inverse quantizer/inverse transformer 33b may be configured not to invert the basis used for inverse orthogonal transformation processing with respect to above-described transformation coefficient.

In addition, if the intra predictor 33a generates the predicted image by using the reference pixels neighboring in three directions, such as the right side, the left side, and the upper side, the inverse quantizer/inverse transformer 33b may be configured not to invert the basis used for inverse orthogonal transformation processing with respect to above-described transformation coefficient.

The decoded image generator 33c is configured to generate a locally decoded image by adding the predicted image generated by the intra predictor 33a and the residual signal generated by the inverse quantizer/inverse transformer 33b.

The memory 34 is configured to hold the locally decoded image generated by the sequentially locally decoded image generator 33 so as to be usable as a reference image for intra prediction and inter prediction.

Figure 5:
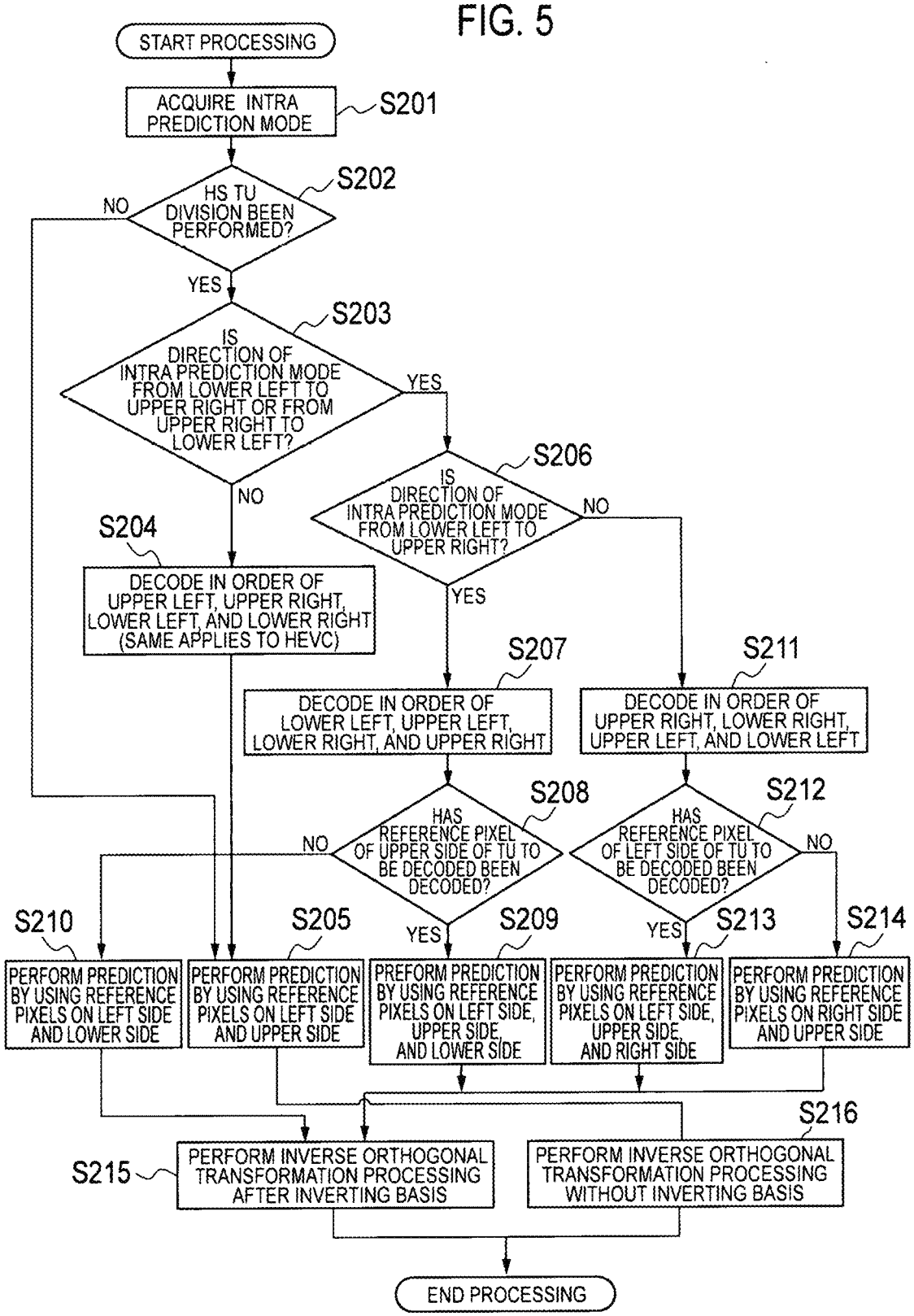
FIG. 5 is a flowchart illustrating the operation of the decoding device 3 according to the first embodiment.

FIG. 5 illustrates a flowchart for explaining an example of the operation of determining the decoding order by the decoding device 3 according to the present embodiment.

As illustrated in FIG. 5, in step S201, the decoding device 3 acquires the intra prediction mode from the stream output from the encoding device 1.

In step S202, the decoding device 3 determines whether the CU is divided into the plurality of TUs based on the flag information included in the stream output from the encoding device 1. In step S202, if it is determined that the CU is divided into the plurality of TUs, the operation proceeds to step S203. On the other hand, in step S202, if it is determined that the CU is not divided into the plurality of TUs, the operation proceeds to step S205.

In step S205, the decoding device 3 performs predefined prediction on the TU to be decoded by using the decoded reference pixels neighboring on the left side and the upper side of the TU.

In step S203, the decoding device 3 determines whether the direction of the intra prediction mode is the direction from the lower left to the upper right or the direction from the upper right to the lower left. If it is determined in step S203 that the direction of the intra prediction mode is the direction from the lower left to the upper right or the direction from the upper right to the lower left, the operation proceeds to step S206. On the other hand, if it is determined in step S203 that the direction of the intra prediction mode is other than the direction from the lower left to the upper right and the direction from the upper right to the lower left, the operation proceeds to step S204.

In step S204, the decoding device 3 adopts the raster scan order (Z type as illustrated in FIG. 8A) used in the conventional HEVC as the decoding order described above.

If it is determined that the direction of the intra prediction mode is the direction from the lower left to the upper right (step S206), in step S207, the decoding device 3 adopts, as the decoding order, a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A)→TU #A1 (upper left TU in CU #A)→TU #A4 (lower right TU in CU #A)→TU #A2 (upper right TU in CU #A).

On the other hand, if it is determined that the direction of the intra prediction mode is not the direction from the lower left to the upper right (step S206), in step S211, the decoding device 3 adopts, as the decoding order, a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

In step S208, the decoding device 3 determines whether the reference pixel neighboring to the upper side of the TU to be decoded has been decoded. In step S208, if decoded, the operation proceeds to step S209, and if not decoded, the operation proceeds to step S210.

In step S209, the decoding device 3 performs predefined prediction on the TU to be decoded by using the decoded reference pixels neighboring on the left side, the upper side, and the lower side of the TU.

In step S210, the decoding device 3 performs predefined prediction on the TU to be decoded by using the decoded reference pixels neighboring on the left side and the lower side of the TU.

In step S212, the decoding device 3 determines whether the reference pixel neighboring to the left side of the TU to be decoded has been decoded. In step S212, if decoded, the operation proceeds to step S213, and if not decoded, the operation proceeds to step S214.

In step S213, the decoding device 3 performs predefined prediction on the TU to be decoded by using the decoded reference pixels neighboring on the left side, the upper side, and the right side of the TU.

In step S214, the decoding device 3 performs predefined prediction on the TU to be decoded by using the decoded reference pixels neighboring on the right side and the upper side of the TU.

In step S215, the decoding device 3 inverts the basis of at least one of the vertical direction and the horizontal direction, generates the residual signal by performing inverse orthogonal transformation processing on the above-described transformation coefficient, and performs subsequent processing.

In step S216, the decoding device 3 generates the residual signal by performing inverse orthogonal transformation processing on the above-described transformation coefficient without inverting the basis, and performs subsequent processing.

According to the decoding device 3 of the present embodiment, if the predicted image is generated by using the reference pixel positioned on at least one of the right side and the lower side, the basis is inverted with respect to the transformation coefficient and then the inverse orthogonal transformation processing is performed, thereby reducing an increase in entropy.

Second Embodiment

Hereinafter, referring to FIGS. 6 and 7, an encoding device 1 and a decoding device 3 according to a second embodiment of the present invention will be described, focusing on the difference from the encoding device 1 and the decoding device 3 according to the first embodiment.

In the encoding device 1 according to the present embodiment, if an intra predictor 14a generates a predicted image by using reference pixels positioned on at least one of the right side and the lower side, an orthogonal transformer/quantizer 14c is configured to perform orthogonal transformation processing after inverting a residual signal generated by a residual signal generator 14b in at least one of a horizontal direction and a vertical direction.

For example, if the intra predictor 14a generates the predicted image by using reference pixels positioned on the left side and the lower side, the orthogonal transformer/quantizer 14c may be configured to perform orthogonal transformation processing after inverting the residual signal generated by the residual signal generator 14b in the vertical direction.

In addition, if the intra predictor 14a generates the predicted image by using reference pixels positioned on the right side and the upper side, the orthogonal transformer/quantizer 14c may be configured to perform orthogonal transformation processing after inverting the residual signal generated by the residual signal generator 14b in the horizontal direction.

Furthermore, if the intra predictor 14a generates the predicted image by using reference pixels positioned on the right side and the lower side, the orthogonal transformer/quantizer 14c may be configured to perform orthogonal transformation processing after inverting the residual signal generated by the residual signal generator 14b in the vertical direction and the horizontal direction.

If the intra predictor 14a generates the predicted image by using the reference pixel positioned on at least one of the right side and the lower side, and if the orthogonal transformation processing to be applied is asymmetric orthogonal transformation processing (for example, DST or the like), the orthogonal transformer/quantizer 14c may be configured to perform orthogonal transformation processing after inverting the residual signal generated by the residual signal generator 14b in at least one of the horizontal direction and the vertical direction.

That is, even if the intra predictor 14a generates the predicted image by using the reference pixel positioned on at least one of the right side and the lower side, if the orthogonal transformation processing to be applied is symmetric orthogonal transformation processing (for example, DCT or the like), the orthogonal transformer/quantizer 14c may be configured to perform orthogonal transformation processing without inverting the residual signal generated by the residual signal generator 14b.

In addition, if the intra predictor 14a generates the predicted image by using the reference pixels neighboring in three directions, such as the lower side, the left side, and the upper side, the orthogonal transformer/quantizer 14c may be configured to perform orthogonal transformation processing without inverting the residual signal generated by the residual signal generator 14b.

In addition, if the intra predictor 14a generates the predicted image by using the reference pixels neighboring in three directions, such as the right side, the left side, and the upper side, the orthogonal transformer/quantizer 14c may be configured to perform orthogonal transformation processing without inverting the residual signal generated by the residual signal generator 14b.

Figure 6:
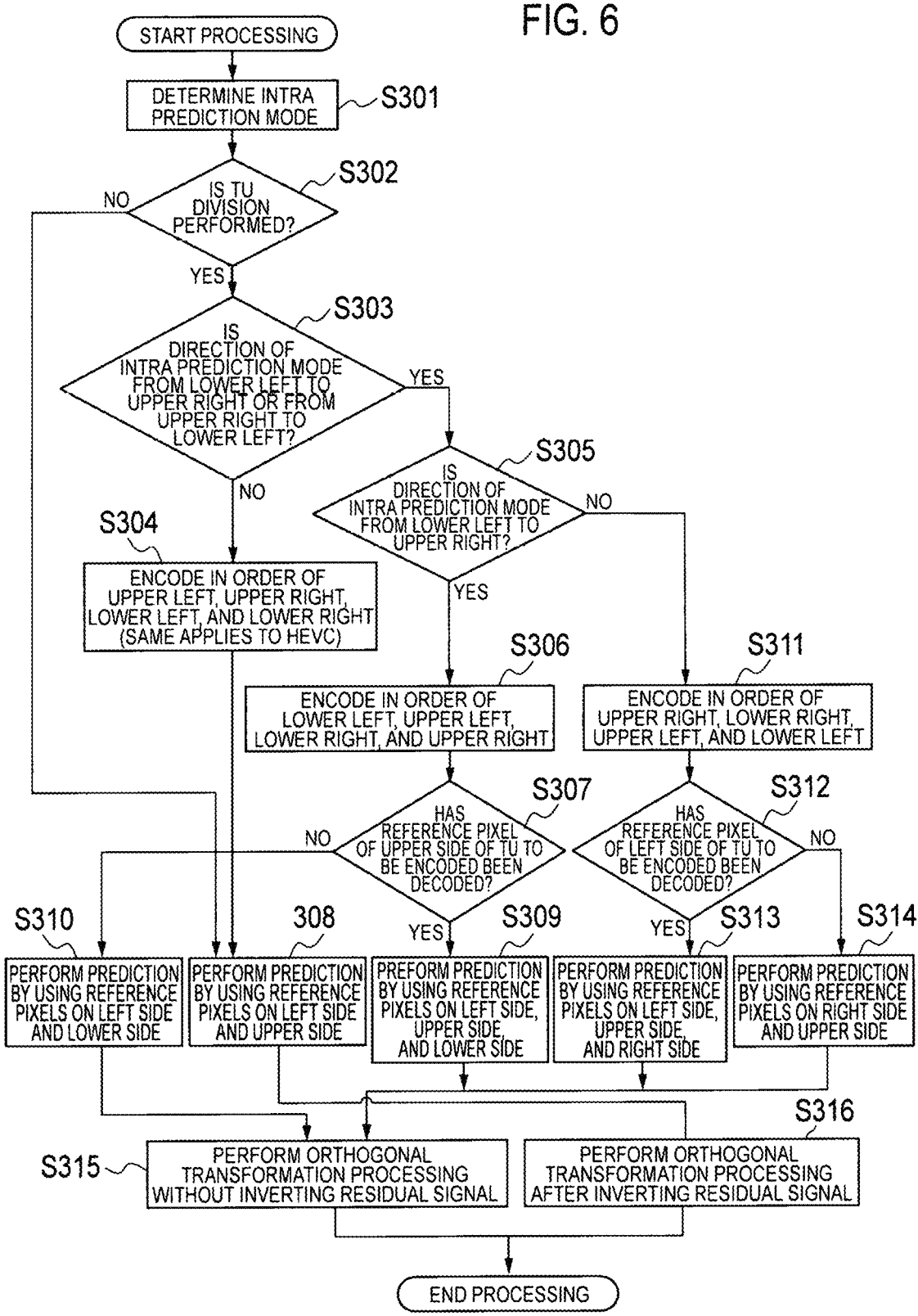
FIG. 6 is a flowchart illustrating an operation of an encoding device 1 according to a second embodiment.

FIG. 6 illustrates a flowchart for explaining an example of the operation of the encoding device 1 according to the present embodiment.

As illustrated in FIG. 6, steps S301 to S314 are the same as steps S101 to S114 illustrated in FIG. 3.

In step 315, the encoding device 1 performs orthogonal transformation processing without inverting the above-described residual signal, and performs subsequent processing.

In step 316, the encoding device 1 performs orthogonal transformation processing after inverting the above-described residual signal in at least one of the horizontal direction and the vertical direction, and performs subsequent processing.

According to the encoding device 1 of the present embodiment, if the predicted image is generated by using the reference pixel positioned on at least one of the right side and the lower side, the orthogonal transformation processing is performed after inverting the residual signal in at least one of the horizontal direction and the vertical direction, thereby reducing an increase in entropy.

In the decoding device 3 according to the present embodiment, if the intra predictor 33a generates a predicted image by using the reference pixel positioned on at least one of the right side and the lower side, the inverse quantizer/inverse transformer 33b is configured to invert the signal, which is obtained by performing the inverse orthogonal transformation processing on the above-described transformation coefficient, in at least one of the horizontal direction and the vertical direction.

For example, if the intra predictor 33a generates a predicted image by using the reference pixels positioned on the left side and the lower side, the inverse quantizer/inverse transformer 33b may be configured to invert the signal, which is obtained by performing inverse orthogonal transformation processing on the above-described transformation coefficient, in the vertical direction.

In addition, if the intra predictor 33a generates a predicted image by using the reference pixels positioned on the right side and the upper side, the inverse quantizer/inverse transformer 33b may be configured to invert the signal, which is obtained by performing inverse orthogonal transformation processing on the above-described transformation coefficient, in the horizontal direction.

Furthermore, if the intra predictor 33a generates a predicted image by using the reference pixels positioned on the right side and the lower side, the inverse quantizer/inverse transformer 33b may be configured to invert the signal, which is obtained by performing inverse orthogonal transformation processing on the above-described transformation coefficient, in the vertical direction and the horizontal direction.

If the intra predictor 33a generates the predicted image by using the reference pixel positioned on at least one of the right side and the lower side, and if the orthogonal transformation processing to be applied is asymmetric orthogonal transformation processing (for example, DST or the like), the inverse quantizer/inverse transformer 33b may be configured to invert the signal obtained by performing inverse orthogonal transformation processing on the above-described transformation coefficient.

That is, even if the intra predictor 33a generates a predicted image by using the reference pixel positioned on at least one of the right side and the lower side, if the orthogonal transformation processing to be applied is symmetric orthogonal transformation processing (for example, DCT or the like), the inverse quantizer/inverse transformer 33b may be configured not to invert the signal obtained by performing the inverse orthogonal transformation processing on the above-described transformation coefficient.

In addition, if the intra predictor 33a generates the predicted image by using the reference pixels neighboring in three directions, such as the lower side, the left side, and the upper side, the inverse quantizer/inverse transformer 33b may be configured not to invert the signal obtained by performing the inverse orthogonal transformation processing on the above-described transformation coefficient.

In addition, if the intra predictor 33a generates the predicted image by using the reference pixels neighboring in three directions, such as the right side, the left side, and the upper side, the inverse quantizer/inverse transformer 33b may be configured not to invert the signal obtained by performing the inverse orthogonal transformation processing on the above-described transformation coefficient.

Figure 7:
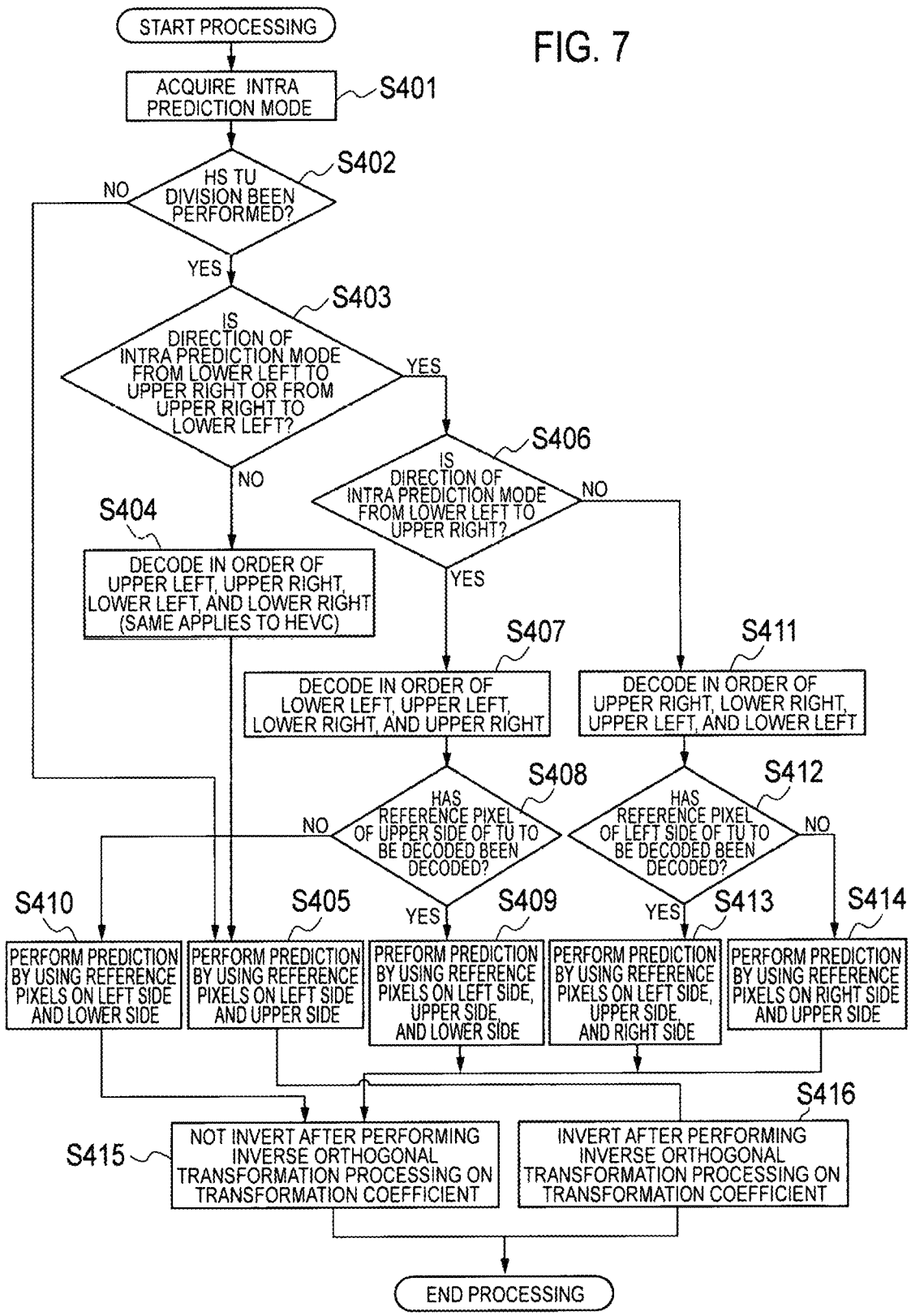
FIG. 7 is a flowchart illustrating the operation of the decoding device 3 according to the second embodiment.

FIG. 7 illustrates a flowchart for explaining an example of the operation of the decoding device 3 according to the present embodiment.

As illustrated in FIG. 7, steps S401 to S414 are the same as steps S201 to S214 illustrated in FIG. 5.

In step 415, the decoding device 3 performs subsequent processing without inverting the signal obtained by performing inverse orthogonal transformation processing on the above-described transformation coefficient.

In step 416, the decoding device 3 inverts the signal, which is obtained by performing the inverse orthogonal transformation processing on the above-described transformation coefficient, in at least one of the horizontal direction and the vertical direction, and then performs subsequent processing.

Third Embodiment

Hereinafter, the encoding device 1 and the decoding device 3 according to the first embodiment of the present invention will be described with reference to FIGS. 1, 2, 4, 8, and 9. Here, the encoding device 1 and the decoding device 3 according to the present embodiment are configured to correspond to intra prediction in a video encoding method such as HEVC. The encoding device 1 and the decoding device 3 according to the present embodiment are configured so as to correspond to arbitrary video encoding methods as long as they are of a video encoding method that performs intra prediction.

The encoding device 1 according to the present embodiment is configured to encode an original image of a frame unit constituting a video by dividing the original image into CUs. In addition, the encoding device 1 according to the present embodiment may be configured to be able to divide a CU into a plurality of TUs. Hereinafter, in the present embodiment, a case where the CU is divided into the plurality of TUs will be described as an example, but the present invention is also applicable to a case where the CU is not divided into the plurality of TUs.

In the present embodiment, in a CU in which there is no neighboring decoded reference pixel such as a CU positioned at the top left in a frame, a reference pixel to be used for generating a predicted image is created by filling a predetermined value ("512" in the case of a 10-bit video). Therefore, it is assumed that all the pixels neighboring to the left side of the CU to be encoded can be used as reference pixels.

As illustrated in FIG. 1, the encoding device 1 according to the present embodiment includes an intra prediction mode determiner 11, a TU division determiner 12, an encoding order controller 13, a sequentially locally decoded image generator 14, a memory 15, and an entropy coder 16.

The intra prediction mode determiner 11 is configured to determine an optimum intra prediction mode to be applied to a CU.

The TU division determiner 12 is configured to determine whether to divide a CU into a plurality of TUs. In the present embodiment, as a method of dividing a CU into a plurality of TUs, a case of 4-division is described as an example, but the division number and the division shape when dividing a CU into a plurality of TUs are not limited to such a case.

The encoding order controller 13 is configured to determine the encoding order of the TUs in the CU based on the intra prediction mode (for example, the direction of the intra prediction mode).

Figure 10A:
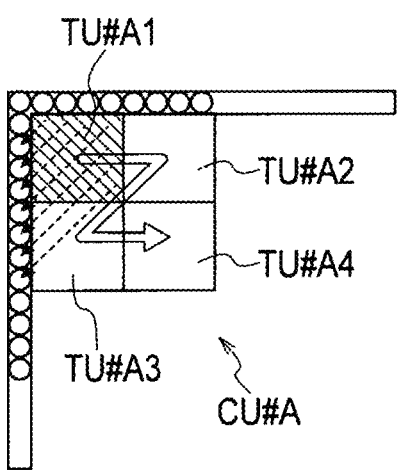
FIGS. 10A and 10B are diagrams for describing a conventional HEVC.
Figure 10B:
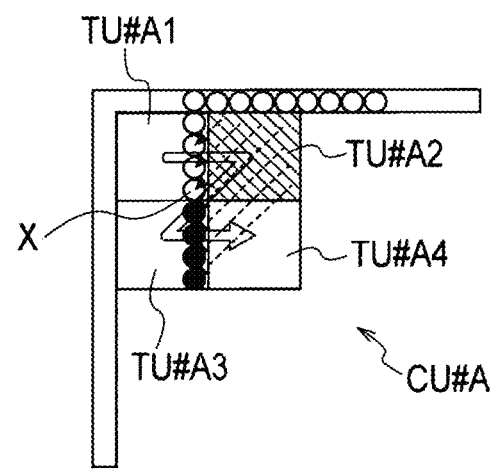
Figure 11:
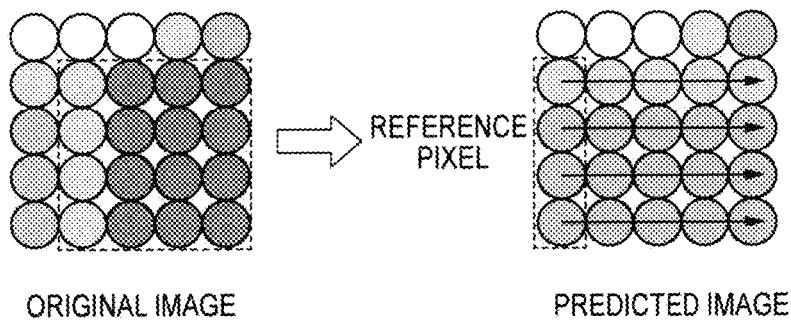
FIG. 11 is a diagram for describing a conventional HEVC.
Figure 12:
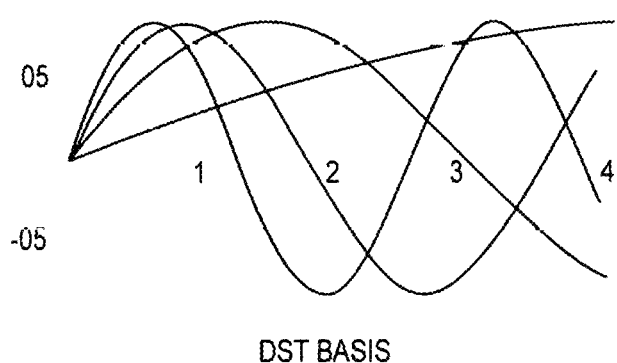
FIG. 12 is a diagram for describing a conventional HEVC.
Figure 13:
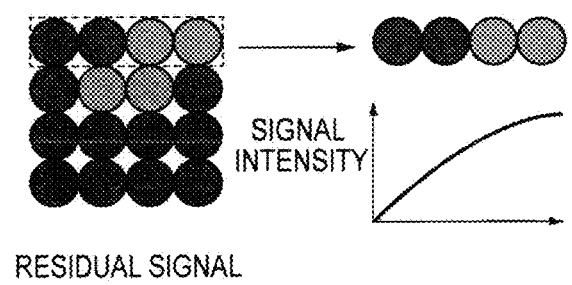
FIG. 13 is a diagram for describing a conventional HEVC.

Specifically, if it is determined by the TU division determiner 12 to divide the CU into the plurality of TUs, as illustrated in FIGS. 2A to 2D, if the direction of the intra prediction mode determined by the intra prediction mode determiner 11 is the direction from the lower left to the upper right (that is, if the direction prediction is performed from the lower left to the upper right), the encoding order controller 13 may be configured to adopt a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A)→TU #A1 (upper left TU in CU #A)→TU #A4 (lower right TU in CU #A) TU #A2 (upper right TU in CU #A TU), as the encoding order of the TU in the CU, instead of the conventional raster scan order (Z type as illustrated in FIG. 10A).

In addition, if it is determined by the TU division determiner 12 to divide the CU into the plurality of TUs, and if the direction of the intra prediction mode determined by the intra prediction mode determiner 11 is the direction from the upper right to the lower left (that is, if the direction prediction is performed from the upper right to the lower left), the encoding order controller 13 may be configured to adopt a predefined encoding order between the encoding order of TU #A2 (upper right TU in CU #A)→TU #A4 (lower right TU in CU #A) TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A), Instead of the conventional raster scan order (Z type as illustrated in FIG. 10A).

The sequentially locally decoded image generator 14 is configured to generate locally decoded images (decoded images for each TU) based on the encoding order determined by the encoding order controller 13 and the method of dividing the CU into TUs.

Specifically, if it is determined by the TU division determiner 12 to divide the CU into the plurality of TUs, the sequentially locally decoded image generator 14 is configured to sequentially generate the locally decoded images according to the encoding order determined by the encoding order controller 13.

As illustrated in FIG. 1, the sequentially locally decoded image generator 14 includes an intra predictor 14a, a residual signal generator 14b, an orthogonal transformer/quantizer 14c, an inverse quantizer/inverse orthogonal transformer 14d, and a locally decoded image generator 14e.

The intra predictor 14a is configured to generate a predicted image by using the intra prediction mode determined by the intra prediction mode determiner 11. That is, the intra predictor 14d is configured to determine the position of the reference pixel used for generating the predicted image.

Specifically, if it is determined by the TU division determiner 12 to divide the CU into the plurality of TUs, as illustrated in FIGS. 2A to 2D, if the direction of the intra prediction mode (prediction direction) is the direction from the lower left to the upper right, the intra predictor 14a may be configured to generate a predicted image in a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A)→TU #A1 (upper left TU in CU #A)→TU #A4 (lower right TU in CU #A)→TU #A2 (upper right TU in CU #A).

Here, as illustrated in FIGS. 2C and 2D, the intra predictor 14a may be configured to generate a predicted image by using decoded reference pixels neighboring on the left side and the lower side with respect to TU #A1 (upper left TU in CU #A) and TU #A2 (upper right TU in CU #A) where the neighboring lower reference pixels are decoded.

In addition, in the encoding device 1 according to the present embodiment, if it is determined by the TU division determiner 12 to divide the CU into the plurality of TUs, and if the direction of the intra prediction mode (prediction direction) is the direction from the upper right to the lower left, the intra predictor 14a may be configured to generate a predicted image in a predefined encoding order between the encoding order of TU #A2 (upper right TU in CU #A)→TU #A4 (lower right TU in CU #A)→TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A).

Here, the intra predictor 14a may be configured to generate a predicted image by using decoded reference pixels neighboring on the upper side and the right side with respect to TU #A1 (upper left TU in CU #A) and TU #A3 (lower left TU in CU #A) wherein the neighboring right reference pixels are decoded.

Alternatively, if the encoding order of TU #A3 (lower left TU in CU #A)→TU #A4 (lower right TU in CU #A)→TU #A1 (upper left TU in CU #A)→TU #A2 (upper right TU in CU #A), or the encoding order of TU #A3 (lower left TU in CU #A)→TU #A1 (upper left TU in CU #A)→TU #A4 (lower right TU in CU #A)→TU #A2 (upper right TU in CU #A) is used, the intra predictor 14a may be configured to perform predefined prediction such as linear interpolation using decoded reference pixels neighboring to the left side, upper side, or lower side of the TU with respect to the TU in which reference pixels neighboring to the upper side are decoded (TU positioned at the uppermost position among the divided TU groups, TU #A1 and TU #A2 in the example of FIG. 2), instead of a common intra prediction direction in CU #A.

The residual signal generator 14b is configured to generate a residual signal from a difference between the predicted image generated by the intra predictor 14a and the original image.

Here, if the "TransformSkip mode" is applied (in the case where the orthogonal transformation is not applied), the residual signal generator 14b may be configured to invert the generated residual signal in at least one of the horizontal direction and the vertical direction, based on the position of the reference pixel used for generating the predicted image determined by the intra predictor 14a.

For example, if the "TransformSkip mode" is applied and the intra predictor 14a generates the predicted image by using the reference pixels positioned on the left side and the lower side, the residual signal generator 14b may be configured to invert the generated residual signal in the horizontal direction and concentrate the energy of the residual signal on the upper left region.

In addition, if the "TransformSkip mode" is applied and the intra predictor 14a generates the predicted image by using the reference pixels positioned on the right side and the upper side, the residual signal generator 14b may be configured to invert the generated residual signal in the vertical direction and concentrate the energy of the residual signal on the upper left region.

In addition, if the "TransformSkip mode" is applied and the intra predictor 14a generates the predicted image by using the reference pixels positioned on the left side and the upper side, the residual signal generator 14b may be configured to invert the generated residual signal in the vertical direction and the horizontal direction and concentrate the energy of the residual signal on the upper left region, as in the case of applying the "TransformSkip mode" in the conventional HEVC.

In addition, if the "TransformSkip mode" is applied and the intra predictor 14a generates the predicted image by using the reference pixels positioned on the left side, the upper side, and lower side, the residual signal generator 14b may be configured to invert the generated residual signal in the horizontal direction and concentrate the energy of the residual signal on the left region.

Furthermore, if the "TransformSkip mode" is applied and the intra predictor 14a generates the predicted image by using the reference pixels positioned on the left side, the upper side, and the right side, the residual signal generator 14b may be configured to invert the generated residual signal in the vertical direction and concentrate the energy of the residual signal on the upper region.

The inversion processing of the residual signal may be realized by other functions such as the orthogonal transformer/quantizer 14c or the entropy coder 16, instead of the residual signal generator 14b. For example, instead of inverting the residual signal, the entropy coder 16 may be configured to change the scan order of coefficients so as to obtain the same effect as the inversion of the residual signal.

On the other hand, if the "TransformSkip mode" is applied, and if the intra predictor 14a does not generate the predicted image even when using the reference pixels positioned on the left side or the upper side, it may be configured not to invert the generated residual signal.

The orthogonal transformer/quantizer 14c is configured to perform orthogonal transformation processing and quantization processing on the residual signal generated by the residual signal generator 14b to generate quantized transformation coefficients.

Here, if the "TransformSkip mode" is applied, the orthogonal transformer/quantizer 14c is configured to perform only quantization processing on the residual signal generated by the residual signal generator 14b, without performing orthogonal transformation processing thereon.

Alternatively, if the "TransformSkip mode" is applied, both the orthogonal transformation processing and the quantization processing are not performed, and the residual signal generated by the residual signal generator 14b may be output as it is.

The inverse quantizer/inverse orthogonal transformer 14d is configured to generate the residual signal by performing inverse quantization processing and inverse orthogonal transformation processing again on the quantized transformation coefficients generated by the orthogonal transformer/quantizer 14c.

Here, if the "TransformSkip mode" is applied, the inverse quantizer/inverse orthogonal transformer 14d is configured to generate the residual signal by performing only inverse quantization processing on the quantized residual signal generated by the orthogonal transformer/quantizer 14c, without performing inverse orthogonal transformation processing thereon.

Alternatively, if the "TransformSkip mode" is applied, both the orthogonal transformation processing and the quantization processing are not performed, and the residual signal generated by the orthogonal transformer/quantizer 14c may be output as it is.

The locally decoded image generator 14e is configured to generate the locally decoded image by adding the predicted image generated by the intra predictor 14a to the residual signal generated by the inverse quantizer/inverse orthogonal transformer 14d.

The memory 15 is configured to hold the locally decoded image generated by the sequentially locally decoded image generator 14 so as to be usable as a reference image.

The entropy coder 16 is configured to output a stream by performing entropy coding processing on flag information including the intra prediction mode or the like determined by the intra prediction mode determiner 11 or the quantized transformation coefficients.

Figure 8:
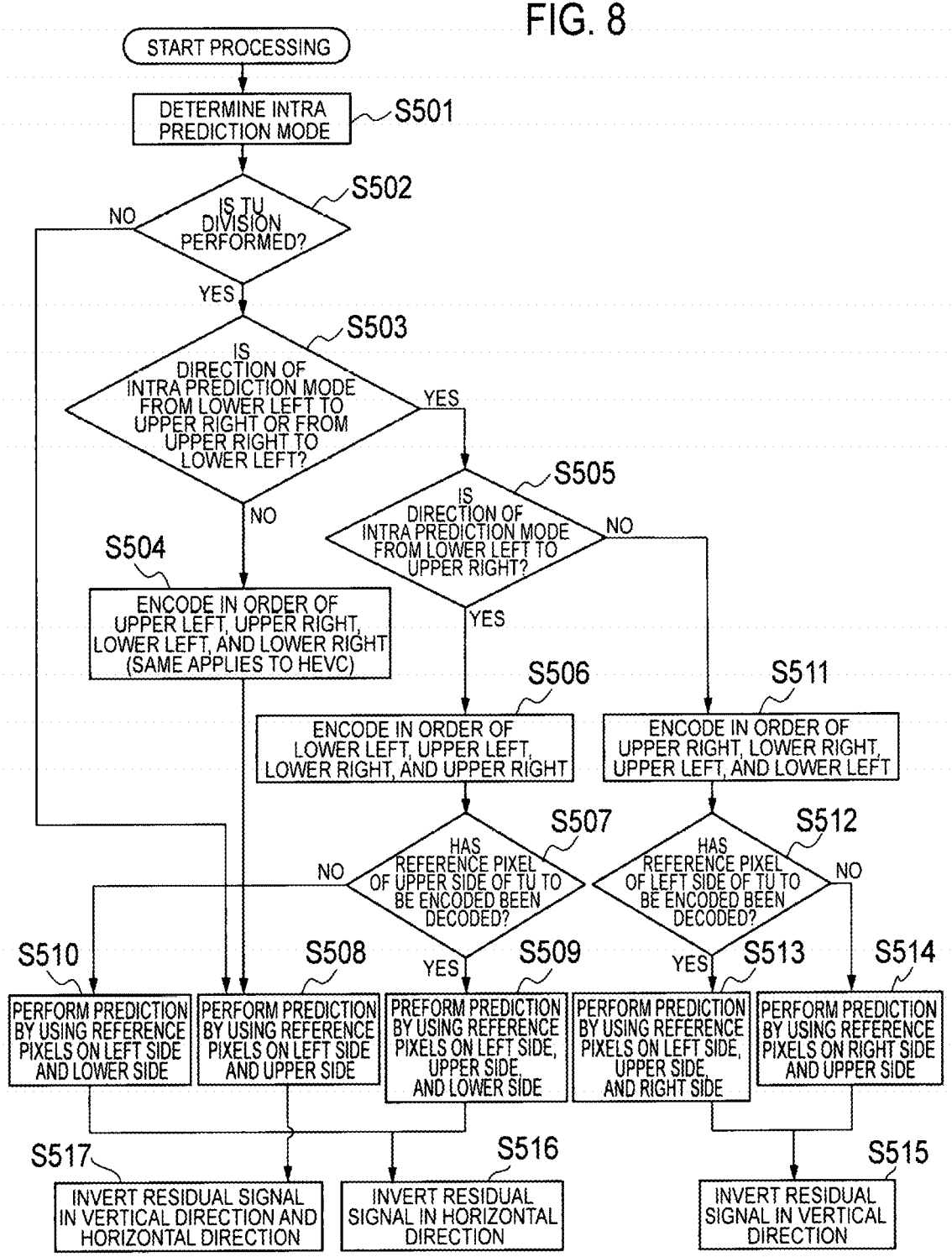
FIG. 8 is a flowchart illustrating an operation of an encoding device 1 according to a third embodiment.

FIG. 8 illustrates a flowchart for explaining an example of the operation of the encoding device 1 according to the present embodiment when the "TransformSkip mode" is applied.

As illustrated in FIG. 8, in step S501, the encoding device 1 determines an optimum intra prediction mode to be applied to the CU.

In step S502, the encoding device 1 determines whether to divide the CU into the plurality of TUs. If it is determined in step S502 to divide the CU into the plurality of TUs, the operation proceeds to step S503. On the other hand, if it is determined in step S502 that the CU is not divided into the plurality of TUs, the operation proceeds to step S508.

If it is determined in step S503 that the direction of the intra prediction mode is the direction from the lower left to the upper right or the direction from the upper right to the lower left, the operation proceeds to step S505. On the other hand, if it is determined in step S503 that the direction of the intra prediction mode is other than the direction from the lower left to the upper right and the direction from the upper right to the lower left, the operation proceeds to step S504.

In step S504, the encoding device 1 adopts the raster scan order (Z type as illustrated in FIG. 10A) used in the conventional HEVC as the encoding order described above.

In step S508, the encoding device 1 performs predefined prediction on the TU to be encoded by using the decoded reference pixels neighboring on the left side and the upper side of the TU.

If it is determined that the direction of the intra prediction mode is the direction from the lower left to the upper right (step S505), in step S506, the encoding device 1 adopts, as the encoding order, a predefined encoding order between the encoding order of TU #A3 (lower left TU in CU #A)→TU #A4 (lower right TU in CU #A)→TU #A1 (upper left TU in CU #A)→TU #A2 (upper right TU in CU #A), and the encoding order of TU #A3 (lower left TU in CU #A) TU #A1 (upper left TU in CU #A)→TU #A4 (lower right TU in CU #A)→TU #A2 (upper right TU in CU #A).

On the other hand, if it is determined that the direction of the intra prediction mode is not the direction from the lower left to the upper right (step S505), in step S511, the encoding device 1 adopts, as the encoding order, a predefined encoding order between the encoding order of TU #A2 (upper right TU in CU #A)→TU #A4 (lower right TU in CU #A)→TU #A1 (upper left TU in CU #A)→TU #A3 (lower left TU in CU #A), and the encoding order of TU #A2 (upper right TU in CU #A)→TU #A1 (upper left TU in CU #A)→TU #A4 (lower right TU in CU #A)→TU #A3 (lower left TU in CU #A).

In step S507, the encoding device 1 determines whether the reference pixel neighboring to the upper side of the TU to be encoded has been decoded. In step S507, if decoded, the operation proceeds to step S509, and if not decoded, the operation proceeds to step S510.

In step S509, the encoding device 1 performs predefined prediction on the TU to be encoded by using the decoded reference pixels neighboring on the left side, the upper side, and the lower side of the TU.

In step S510, the encoding device 1 performs predefined prediction on the TU to be encoded by using the decoded reference pixels neighboring on the left side and the lower side of the TU.

In step S512, the encoding device 1 determines whether the reference pixel neighboring to the left side of the TU to be encoded has been decoded. In step S512, if decoded, the operation proceeds to step S513, and if not decoded, the operation proceeds to step S514.

In step S513, the encoding device 1 performs predefined prediction on the TU to be encoded by using the decoded reference pixels neighboring on the left side, the upper side, and the right side of the TU.

In step S514, the encoding device 1 performs predefined prediction on the TU to be encoded by using the decoded reference pixels neighboring on the right side and the upper side of the TU.

In step S515, the encoding device 1 inverts the residual signal generated by using the predicted image and the original image in the vertical direction, and performs subsequent processing.

In step S516, the encoding device 1 inverts the residual signal generated by using the predicted image and the original image in the horizontal direction, and performs subsequent processing.

In step S517, the encoding device 1 inverts the residual signal generated by using the predicted image and the original image in the vertical direction and the horizontal direction, and performs subsequent processing.

According to the encoding device 1 of the present embodiment, even if the reference pixels of at least one of the lower side and the right side are used for intra prediction and the TransformSkip mode is applied (if the orthogonal transformation processing is not applied to the residual signal), it is possible to suppress a reduction in encoding efficiency.

In addition, the decoding device 3 according to the present embodiment is configured to decode an original image of a frame unit constituting a video by dividing the original image into CUs. In addition, as in the encoding device 1 according to the present embodiment, the decoding device 3 according to the present embodiment is configured to be able to divide a CU into a plurality of TUs.

As illustrated in FIG. 4, the decoding device 3 according to the present embodiment includes an entropy decoder 31, a decoding order controller 32, a sequentially locally decoded image generator 33, and a memory 34.

The entropy decoder 31 is configured to decode transformation coefficients, flag information, or the like from the stream output from the encoding device 1 by applying entropy decoding processing on the stream output from the encoding device 1. Here, the transformation coefficient is a quantized transformation coefficient obtained as a signal encoded by dividing an original image of a frame unit into CUs by the encoding device 1.

In addition, the flag information includes accompanying information such as the prediction mode or information indicating whether the "TransformSkip mode" is selected.

The decoding order controller 32 is configured to determine the decoding order of the TUs in the CU based on the intra prediction mode.

Specifically, the decoding order controller 32 is configured to determine the decoding order of the TUs in the CU according to the flag indicating whether the TU division output by the entropy decoder 31 has been performed (whether the CU is divided into the plurality of TUs) and the direction of the intra prediction mode.

For example, as in the encoding order controller 13, if the CU is divided into the plurality of TUs, and if the direction of the intra prediction mode is the direction from the lower left to the upper right, the decoding order controller 32 may be configured to perform decoding processing in a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A)→TU #A1 (upper left TU in CU #A)→TU #A4 (lower right TU in CU #A)→TU #A2 (upper right TU in CU #A).

In addition, as in the encoding order controller 13, if the CU is divided into the plurality of TUs, and if the direction of the intra prediction mode is the direction from the upper right to the lower left, the decoding order controller 32 may be configured to perform decoding processing in a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

The sequentially locally decoded image generator 33 is configured to generate locally decoded images (decoded images for each TU) based on the decoding order determined by the decoding order controller 32 and the method of dividing the CU into the TUs.

Specifically, if the CU is divided into the plurality of TUs, the sequentially locally decoded image generator 33 is configured to generate the locally decoded image by sequentially performing intra prediction, inverse quantization processing, and inverse orthogonal transformation processing on the quantized transformation coefficients output by the entropy decoder 31 according to the decoding order determined by the decoding order controller 32.

As illustrated in FIG. 4, the sequentially locally decoded image generator 33 includes an intra predictor 33a, an inverse quantizer/inverse transformer 33b, and a decoded image generator 33c.

The intra predictor 33a may be configured to generate the predicted image by using the intra prediction mode output by the entropy decoder 31 according to the decoding order determined by the decoding order controller 32.

Specifically, if the CU is divided into the plurality of TUs, and if the direction of the intra prediction mode is the direction from the lower left to the upper right, the intra predictor 33a may be configured to generate a predicted image in a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A)→TU #A1 (upper left TU in CU #A)→TU #A4 (lower right TU in CU #A)→TU #A2 (upper right TU in CU #A).

Here, as illustrated in FIGS. 2C and 2D, the intra predictor 33a may be configured to generate a predicted image by using decoded reference pixels neighboring on the left side and the lower side with respect to TU #A1 (upper left TU in CU #A) and TU #A2 (upper right TU in CU #A) where the neighboring lower reference pixels are decoded.

In addition, in the decoding device 3 according to the present embodiment, if the CU is divided into the plurality of TUs, and if the direction of the intra prediction mode (prediction direction) is the direction from the upper right to the lower left, the intra predictor 33a may be configured to generate a predicted image in a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

Here, the intra predictor 33a may be configured to generate a predicted image by using decoded reference pixels neighboring on the upper side and the right side with respect to TU #A1 (upper left TU in CU #A) and TU #A3 (lower left TU in CU #A) wherein the neighboring right reference pixels are decoded.

Alternatively, if the decoding order of TU #A3 (lower left TU in CU #A)→TU #A4 (lower right TU in CU #A)→TU #A1 (upper left TU in CU #A)→TU #A2 (upper right TU in CU #A), or the decoding order of TU #A3 (lower left TU in CU #A)→TU #A1 (upper left TU in CU #A)→TU #A4 (lower right TU in CU #A)→TU #A2 (upper right TU in CU #A) is used, the intra predictor 33a may be configured to perform predefined prediction such as linear interpolation using decoded reference pixels neighboring to the left side, upper side, or lower side of the TU with respect to the TU in which reference pixels neighboring to the upper side are decoded (TU positioned at the uppermost position among the divided TU groups, TU #A1 and TU #A2 in the example of FIG. 2), instead of a common intra prediction direction in CU #A.

The inverse quantizer/inverse transformer 33b is configured to generate a residual signal by performing inverse quantization processing and inverse transformation processing (for example, inverse orthogonal transformation processing) on the quantized transformation coefficients output by the entropy decoder 31.

Here, if the "TransformSkip mode" is applied (if the inverse orthogonal transformation processing is not applied), the inverse quantizer/inverse transformer 33b is configured to perform only inverse quantization processing on the signal obtained by entropy decoding processing, without performing inverse transformation processing thereon.

Alternatively, if the "TransformSkip mode" is applied, both the inverse orthogonal transformation processing and the inverse quantization processing are not performed, and the signal generated by the entropy decoding processing may be output as it is.

Here, if the "TransformSkip mode" is applied, the inverse quantizer/inverse transformer 33b may be configured to generate the residual signal by inverting the signal, which is obtained by the entropy decoding processing and the inverse quantization processing, in at least one of the horizontal direction and the vertical direction, based on the position of the reference pixel used when the intra predictor 33a generates the predicted image.

For example, if the "TransformSkip mode" is applied and the intra predictor 33a generates the predicted image by using the reference pixels positioned on the left side and the lower side, the inverse quantizer/inverse transformer 33b may be configured to generate the residual signal by inverting the signal, which is obtained by the entropy decoding processing and the inverse quantization processing, in the horizontal direction.

In addition, if the "TransformSkip mode" is applied and the intra predictor 33a generates the predicted image by using the reference pixels positioned on the right side and the upper side, the inverse quantizer/inverse transformer 33b may be configured to generate the residual signal by inverting the signal, which is obtained by the entropy decoding processing and the inverse quantization processing, in the vertical direction.

In addition, if the "TransformSkip mode" is applied and the intra predictor 33a generates the predicted image by using the reference pixels positioned on the left side and the upper side, the inverse quantizer/inverse transformer 33b may be configured to generate the residual signal by inverting the signal, which is obtained by the entropy decoding processing and the inverse quantization processing, in the vertical direction and the horizontal direction, as in the case of applying the "TransformSkip mode" in the conventional HEVC.

In addition, if the "TransformSkip mode" is applied and the intra predictor 33a generates the predicted image by using the reference pixels positioned on the left side, the upper side, and the lower side, the inverse quantizer/inverse transformer 33b may be configured to generate the residual signal by inverting the signal, which is obtained by the entropy decoding processing and the inverse quantization processing, in the horizontal direction.

In addition, if the "TransformSkip mode" is applied and the intra predictor 33a generates the predicted image by using the reference pixels positioned on the left side, the upper side, and the lower side, the inverse quantizer/inverse transformer 33b may be configured to generate the residual signal by inverting the signal, which is obtained by the entropy decoding processing and the inverse quantization processing, in the vertical direction.

On the other hand, if the "TransformSkip mode" is applied and the intra predictor 33a does not generate the predicted image even when using the reference pixels positioned on either the left side or the upper side, the inverse quantizer/inverse transformer 33b may be configured not to invert the signal obtained by the entropy decoding processing and the inverse quantization processing.

The decoded image generator 33c is configured to generate a locally decoded image by adding the predicted image generated by the intra predictor 33a and the residual signal generated by the inverse quantizer/inverse transformer 33b.

The memory 34 is configured to hold the locally decoded image generated by the sequentially locally decoded image generator 33 so as to be usable as a reference image for intra prediction and inter prediction.

Figure 9:
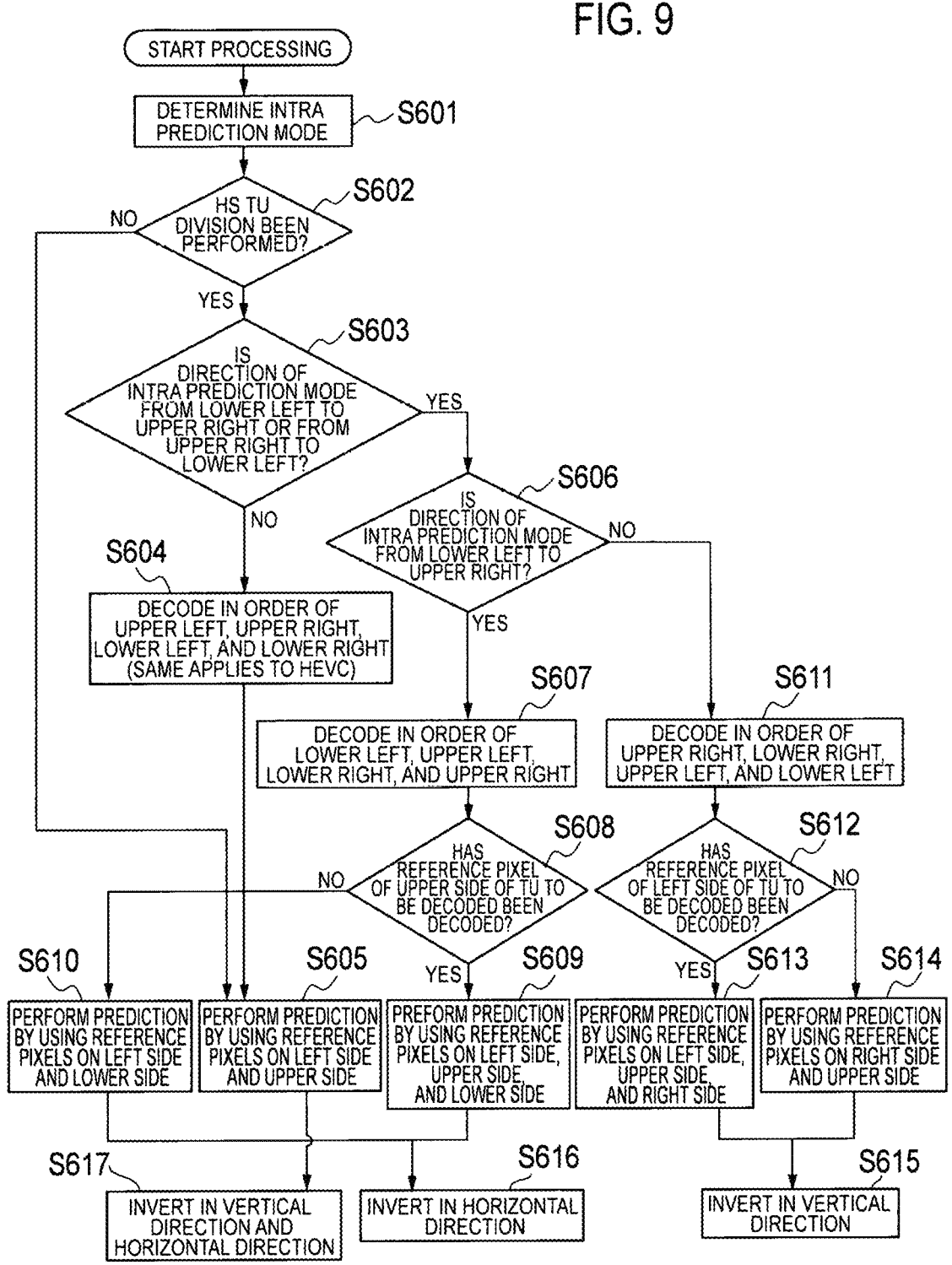
FIG. 9 is a flowchart illustrating an operation of a decoding device 3 according to the third embodiment.

FIG. 9 illustrates a flowchart for explaining an example of the operation of determining the decoding order by the decoding device 3 according to the present embodiment when the "TransformSkip mode" is applied.

As illustrated in FIG. 9, in step S601, the decoding device 3 acquires the intra prediction mode from the stream output from the encoding device 1.

In step S602, the decoding device 3 determines whether the CU is divided into the plurality of TUs based on the flag information included in the stream output from the encoding device 1. In step S602, if it is determined that the CU is divided into the plurality of TUs, the operation proceeds to step S603. On the other hand, in step S602, if it is determined that the CU is not divided into the plurality of TUs, the operation proceeds to step S605.

In step S605, the decoding device 3 performs predefined prediction on the TU to be decoded by using the decoded reference pixels neighboring on the left side and the upper side of the TU.

In step S603, the decoding device 3 determines whether the direction of the intra prediction mode is the direction from the lower left to the upper right or the direction from the upper right to the lower left. If it is determined in step S603 that the direction of the intra prediction mode is the direction from the lower left to the upper right or the direction from the upper right to the lower left, the operation proceeds to step S606. On the other hand, if it is determined in step S603 that the direction of the intra prediction mode is other than the direction from the lower left to the upper right and the direction from the upper right to the lower left, the operation proceeds to step S604.

In step S604, the decoding device 3 adopts the raster scan order (Z type as illustrated in FIG. 10A) used in the conventional HEVC as the decoding order described above.

If it is determined that the direction of the intra prediction mode is the direction from the lower left to the upper right (step S606), in step S607, the decoding device 3 adopts, as the decoding order, a predefined decoding order between the decoding order of TU #A3 (lower left TU in CU #A)→TU #A4 (lower right TU in CU #A)→TU #A1 (upper left TU in CU #A)→TU #A2 (upper right TU in CU #A), and the decoding order of TU #A3 (lower left TU in CU #A)→TU #A1 (upper left TU in CU #A)→TU #A4 (lower right TU in CU #A)→TU #A2 (upper right TU in CU #A).

On the other hand, if it is determined that the direction of the intra prediction mode is not the direction from the lower left to the upper right (step S606), in step S611, the decoding device 3 adopts, as the decoding order, a predefined decoding order between the decoding order of TU #A2 (upper right TU in CU #A)→TU #A4 (lower right TU in CU #A)→TU #A1 (upper left TU in CU #A)→TU #A3 (lower left TU in CU #A), and the decoding order of TU #A2 (upper right TU in CU #A)→TU #A1 (upper left TU in CU #A)→TU #A4 (lower right TU in CU #A)→TU #A3 (lower left TU in CU #A).

In step S608, the decoding device 3 determines whether the reference pixel neighboring to the upper side of the TU to be decoded has been decoded. In step S608, if decoded, the operation proceeds to step S609, and if not decoded, the operation proceeds to step S610.

In step S609, the decoding device 3 performs predefined prediction on the TU to be decoded by using the decoded reference pixels neighboring on the left side, the upper side, and the lower side of the TU.

In step S610, the decoding device 3 performs predefined prediction on the TU to be decoded by using the decoded reference pixels neighboring on the left side and the lower side of the TU.

In step S612, the decoding device 3 determines whether the reference pixel neighboring to the left side of the TU to be decoded has been decoded. In step S612, if decoded, the operation proceeds to step S613, and if not decoded, the operation proceeds to step S614.

In step S613, the decoding device 3 performs predefined prediction on the TU to be decoded by using the decoded reference pixels neighboring on the left side, the upper side, and the right side of the TU.

In step S614, the decoding device 3 performs predefined prediction on the TU to be decoded by using the decoded reference pixels neighboring on the right side and the upper side of the TU.

In step S615, the decoding device 3 inverts the signal, which is obtained by the entropy decoding processing and the inverse quantization processing, in the vertical direction and performs subsequent processing.

In step S616, the decoding device 3 inverts the signal, which is obtained by the entropy decoding processing and the inverse quantization processing, in the horizontal direction and performs subsequent processing.

In step S617, the decoding device 3 inverts the signal, which is obtained by the entropy decoding processing and the inverse quantization processing, in the vertical direction and the horizontal direction and then performs subsequent processing.

According to the decoding device 3 of the present embodiment, even if the reference pixels of at least one of the lower side and the right side are used for intra prediction and the TransformSkip mode is applied (if the inverse orthogonal transformation processing is not applied to the signal obtained by the entropy decoding processing and the inverse quantization processing), it is possible to suppress a reduction in encoding efficiency.

Other Embodiments

As described above, the present invention has been described with reference to the above-described embodiments, but it should not be understood that the description and drawings constituting a part of the disclosure in such embodiments limit the present invention. From this disclosure, various alternative embodiments, examples, and operational technologies will become apparent to those skilled in the art.

Although not particularly described in the above embodiments, a program for causing a computer to perform each process performed by the encoding device 1 and the decoding device 3 described above may be provided. In addition, the program may be recorded on a computer-readable medium. The program may be installed on the computer by using the computer-readable medium. Here, the computer-readable medium on which the program is recorded may be a non-transitory recording medium. The non-transitory recording medium is not particularly limited, but may be a recording medium such as, for example, CD-ROM and DVD-ROM.

A chip constituted by a memory that stores a program for realizing at least part of the functions of the encoding device 1 and the decoding device 3 and a processor that performs the program stored in the memory may be provided.

What is claimed is:

1. An encoding device configured to encode an original image of a frame unit constituting a video by dividing the original image into encoding target blocks, the encoding device comprising:
   an intra predictor configured to generate a predicted image corresponding to an encoding target block, by using an intra prediction mode and reference pixels;
   a residual signal generator configured to generate a residual signal from a difference between the predicted image and the original image; and
   a transformer configured to generate transformation coefficients by controlling whether to perform inversion in a predetermined direction on signals obtained by transformation processing of the residual signal, based on whether a first condition is satisfied, the first condition being that a direction of the intra prediction mode applied to the encoding target block is within a predetermined range of intra prediction directions,
   wherein, when the first condition is satisfied, the transformer is further configured to refrain from performing the inversion based on a second condition being satisfied, the second condition being that an intra prediction performed by the intra predictor uses at least one pixel among decoded pixels adjacent to a left side of the encoding target block and decoded pixels adjacent to an upper side of the encoding target block, and
   wherein, when the first condition is not satisfied, the transformer is further configured to perform the inversion based on the second condition being satisfied.

2. A decoding device configured to perform decoding of decoding target blocks obtained by dividing an original image of a frame unit constituting a video, the decoding device comprising:
   an intra predictor configured to generate a predicted image corresponding to a decoding target block, by using an intra prediction mode and reference pixels; and
   an inverse transformer configured to control whether to perform inversion in a predetermined direction, after performing inverse transformation processing of transformation coefficients, based on whether a first condition is satisfied, the first condition being that a direction of the intra prediction mode applied to the decoding target block is within a predetermined range of intra prediction directions,
   wherein, when the first condition is satisfied, the inverse transformer is further configured to refrain from performing the inversion based on a second condition being satisfied, the second condition being that an intra prediction performed by the intra predictor uses at least one pixel among decoded pixels adjacent to a left side of the decoding target block and decoded pixels adjacent to an upper side of the decoding target block, and
   wherein, when the first condition is not satisfied, the inverse transformer is further configured to perform the inversion based on the second condition being satisfied.

3. A decoding device configured to perform decoding of decoding target blocks obtained by dividing an original image of a frame unit constituting a video, the decoding device comprising:
   an intra predictor configured to generate a predicted image corresponding to a decoding target block, by using an intra prediction mode and reference pixels; and
   an inverse transformer configured to perform inversion in a predetermined direction, after performing inverse transformation processing of transformation coefficients, based on whether a first condition is satisfied, the first condition being that a direction of the intra prediction mode applied to the decoding target block is within a predetermined range of intra prediction directions; and
   a controller configured to perform a control related to whether the inverse transformer performs the inversion in the predetermined direction, based on positions of the reference pixels used for an intra prediction,
   wherein the controller is configured to
      when the first condition is satisfied, perform a first control as the control in response to a second condition being satisfied, the second condition being that an intra prediction performed by the intra predictor uses at least one pixel among decoded pixels adjacent to a left side of the decoding target block and decoded pixels adjacent to an upper side of the decoding target block, the first control being to refrain from performing the inversion, and
      when the first condition is not satisfied, perform a second control in response to the second condition being satisfied, the second control being to perform the inversion.

* * * * *